(12) United States Patent
Suzuki

(10) Patent No.: US 12,673,424 B2
(45) Date of Patent: Jul. 7, 2026

(54) DEVICE, ROBOT SYSTEM, AND METHOD FOR DETERMINING POSITION OF RECESSED PORTION TO BE FORMED BY SCRAPING

(71) Applicant: Fanuc Corporation, Minamitsuru-gun (JP)

(72) Inventor: Tadanori Suzuki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 18/269,353

(22) PCT Filed: Jan. 17, 2022

(86) PCT No.: PCT/JP2022/001432
§ 371 (c)(1),
(2) Date: Jun. 23, 2023

(87) PCT Pub. No.: WO2022/158427
PCT Pub. Date: Jul. 28, 2022

(65) Prior Publication Data
US 2024/0051138 A1 Feb. 15, 2024

(30) Foreign Application Priority Data

Jan. 22, 2021 (JP) ................................. 2021-008948

(51) Int. Cl.
B25J 9/16 (2006.01)
B23D 79/06 (2006.01)
(Continued)

(52) U.S. Cl.
CPC ............ B25J 9/1669 (2013.01); B23D 79/06 (2013.01); B25J 9/1664 (2013.01); B25J 11/006 (2013.01); B25J 15/0019 (2013.01)

(58) Field of Classification Search
CPC ...... B25J 9/1669; B25J 9/1664; B25J 11/006; B25J 15/0019; B23D 79/06
See application file for complete search history.

(56) References Cited

U.S. PATENT DOCUMENTS

| | | | |
|---|---|---|---|
| 6,926,050 B2 | 8/2005 | Kuwahara et al. | |
| 2001/0023163 A1 | 9/2001 | Kinbara et al. | |

(Continued)

FOREIGN PATENT DOCUMENTS

| | | |
|---|---|---|
| CN | 102962656 A | 3/2013 |
| JP | H07-001229 A | 1/1995 |

(Continued)

OTHER PUBLICATIONS

International Search Report and Written Opinion for International Application No. PCT/JP2022/001432, dated Apr. 5, 2022, 6 pages.

*Primary Examiner* — Wade Miles
*Assistant Examiner* — Jerrod Irvin Davis
(74) *Attorney, Agent, or Firm* — BUCHANAN INGERSOLL & ROONEY PC

(57) ABSTRACT

A device for determining the positions of a plurality of recessed portions to be formed on a surface of a workpiece by means of scraping, in which a robot uses a scraper to shave the surface of the workpiece to make the same flat, is provided with: an input accepting unit for accepting input of shape information of the surface and pattern information of the plurality of recessed portions on the surface; and a position determining unit for automatically determining the position of each recessed portion on the surface on the basis of the shape information and the pattern information accepted by the input accepting unit.

12 Claims, 35 Drawing Sheets

(51) Int. Cl.
  *B25J 11/00*  (2006.01)
  *B25J 15/00*  (2006.01)

(56)  References Cited

U.S. PATENT DOCUMENTS

| | | | |
|---|---|---|---|
| 2015/0056036 A1* | 2/2015 | Yasukochi | ........... B23Q 15/007 |
| | | | 409/131 |
| 2016/0214143 A1 | 7/2016 | Nagatsuka | |

FOREIGN PATENT DOCUMENTS

| | | | |
|---|---|---|---|
| JP | 07276206 A | 10/1995 | |
| JP | H08-016225 A | 1/1996 | |
| JP | 1058285 A | 3/1998 | |
| JP | 11244562 A | 9/1999 | |
| JP | 2004042164 A | 2/2004 | |
| JP | 2010240809 A | 10/2010 | |
| JP | 2016137551 A | 8/2016 | |
| WO | WO-2020184460 A1 * | 9/2020 | ....... G05B 19/41875 |

* cited by examiner

DEVICE, ROBOT SYSTEM, AND METHOD FOR DETERMINING POSITION OF RECESSED PORTION TO BE FORMED BY SCRAPING

CROSS REFERENCE TO RELATED APPLICATIONS

This is the U.S. National Phase application of PCT/JP2022/001432, filed Jan. 17, 2022, which claims priority to Japanese Patent Application No. 2021-008948, filed Jan. 22, 2021, the disclosures of each of these applications being incorporated herein by reference in their entireties for all purposes.

FIELD OF THE INVENTION

The present disclosure relates to a device, a robot system, and a method for determining the position of a recess to be formed on the surface of a workpiece by a scraping process.

BACKGROUND OF THE INVENTION

There is a known robot that performs a scraping process (e.g., Patent Document 1).

PATENT LITERATURE

Patent Document 1: JP 2004-042164 A

SUMMARY OF THE INVENTION

In some cases, a robot may be caused to repeatedly execute the scraping process to form a plurality of recesses on a surface of a workpiece. There is a need to more easily build a robot system that can perform such a scraping process.

In one aspect of the present disclosure, a device configured to determine positions of a plurality of recesses to be formed on a surface of a workpiece by a scraping process in which a robot scrapes the surface with a scraper in order to flatten the surface, includes an input receiving section configured to receive input of shape information of the surface and pattern information of the plurality of recesses on the surface, and a position determination section configured to automatically determine the position of each of the plurality of recesses on the surface, based on the shape information and the pattern information received by the input receiving section.

In another aspect of the present disclosure, a method for determining positions of a plurality of recesses to be formed on a surface of a workpiece by a scraping process in which a robot scrapes the surface with a scraper in order to flatten the surface, includes receiving, by a processor, input of shape information of the surface and pattern information of the plurality of recesses on the surface, and automatically determining, by the processor, the position of each of the plurality of recesses on the surface, based on the shape information and the pattern information received by the input receiving section.

According to the present disclosure, since the position of the recess can be automatically determined on the surface of the workpiece, the task required to launch the robot system for the scraping process can be simplified.

BRIEF DESCRIPTION OF DRAWINGS

FIG. 1 is a schematic diagram of a robot system according to an embodiment.

FIG. 3 is an enlarged view of a scraper as seen from arrow B in FIG. 1.

DETAILED DESCRIPTION OF EMBODIMENTS OF THE INVENTION

Figure 2:
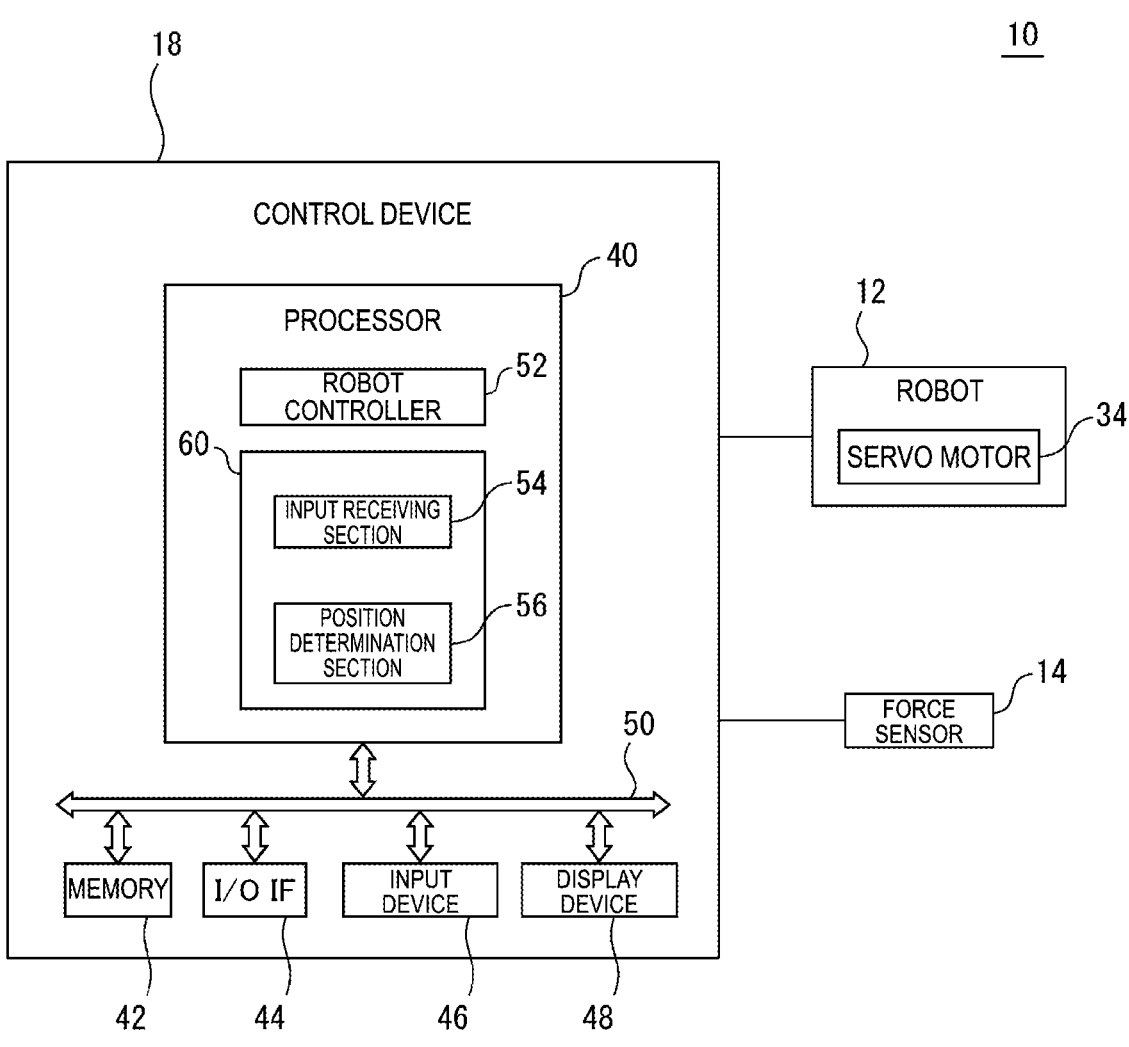
FIG. 2 is a block diagram of the robot system illustrated in FIG. 1.

Hereinafter, embodiments of the present disclosure will be described in detail below based on the drawings. Note that in the various embodiments described below, similar elements are denoted by the same signs, and overlapping descriptions are omitted. In the following description, the x-axis plus direction of a robot coordinate system C1 in the drawings may be sometimes referred to as rightward, the y-axis plus direction as forward, and the z-axis plus direction as upward.

Figure 1:
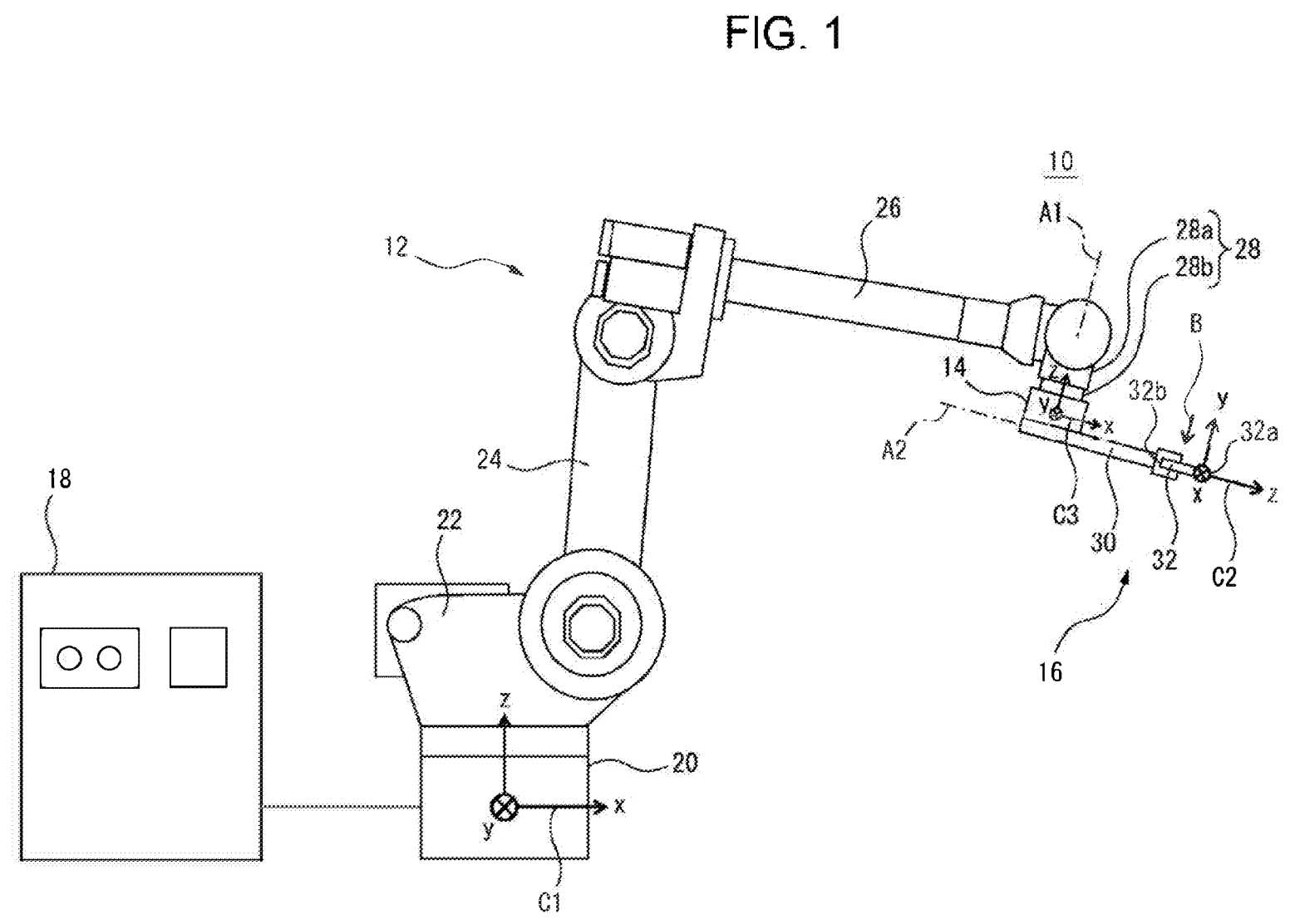

First, a robot system 10 according to one embodiment will be described with reference to FIGS. 1 and 2. The robot system 10 is a system that performs the scraping process that scrapes in order to flatten a surface Q of a workpiece W. The scraping process is a process that scrapes the surface Q of a workpiece W such that fine unevenness formed on the surface Q of the workpiece W has a dimension in a thickness direction of the workpiece W falling within a predetermined range (e.g., on the order of μm). This fine unevenness functions as a so-called "oil retention" configured to store a lubricating oil on the surface Q used as a sliding surface.

For example, the scraping process includes a rough machining for making a fine unevenness formed when a surface of a workpiece is machined by a milling machine or the like to be a first dimension (e.g., 10 μm) or less, and a finish machining for making the minute unevenness to be a second dimension (e.g., 5 μm) or less which is smaller than the first dimension after the rough machining.

The robot system 10 includes a robot 12, a force sensor 14, a scraper 16, and the control device 18. In the present embodiment, the robot 12 is a vertical articulated robot and includes a robot base 20, a turning body 22, a lower arm 24, an upper arm 26, and a wrist 28. The robot base 20 is fixed on the floor of the work cell. The turning body 22 is provided on the robot base 20 being turnable around the vertical axis.

The lower arm 24 is provided at the turning body 22 rotatably about the horizontal axis, and the upper arm 26 is rotatably provided at the tip of the lower arm 24. The wrist 28 includes a wrist base 28a provided rotatably at the tip of the upper arm 26 and a wrist flange 28b provided at the wrist base 28a being turnable about a wrist axis A1.

Each component (the robot base 20, the turning body 22, the lower arm 24, the upper arm 26, the wrist 28) of the robot 12 is provided with a servo motor 34 (FIG. 2). These servo motors 34 rotate each movable element (the turning body 22, the lower arm 24, the upper arm 26, the wrist 28, the wrist flange 28b) of the robot 12 about the drive shaft in response to a command from the control device 18. As a result, the robot 12 can move and arrange the scraper 16 at any position and any orientation.

The force sensor 14 detects a pressing force F by which the robot 12 presses the scraper 16 against the surface of the workpiece W. For example, the force sensor 14 is a six-axis force sensor including a body having a cylindrical shape and a plurality of strain gauges provided at the body, and is interposed between the wrist flange 28b and the scraper 16.

In the present embodiment, the force sensor 14 is arranged such that a center axis of the force sensor 14 coincides with the wrist axis A1.

The scraper 16 is fixed to the tip of the force sensor 14 and scrapes the surface of the workpiece W for the scraping process. Specifically, the scraper 16 includes a handle portion 30 with flexibility and a blade portion 32 fixed to the tip of the handle portion 30. The handle portion 30 includes a base end fixed to the tip of the force sensor 14. The handle portion 30 extends linearly along an axis line A2 from the tip of the force sensor 14. The blade portion 32 extends along the axis line A2 from a base end 32b to a tip 32a thereof. Note that the axis line A2 may be substantially orthogonal to the wrist axis A1.

Figure 3:
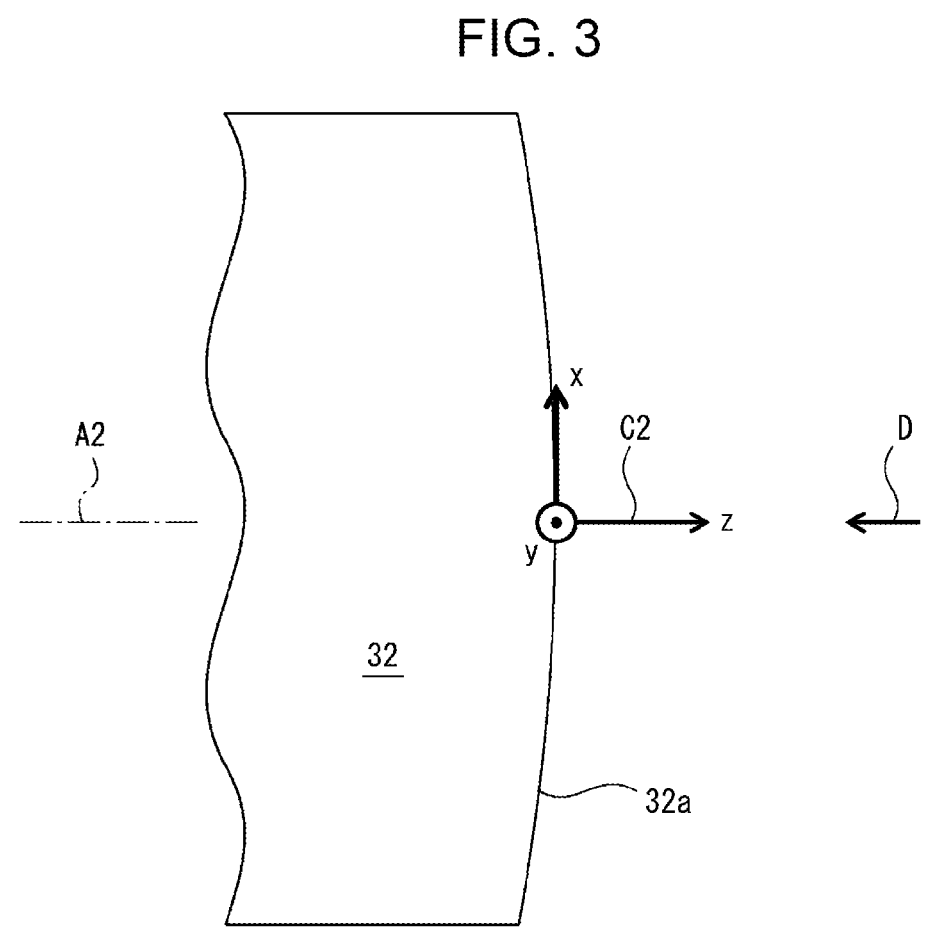

As illustrated in FIG. 3, the tip 32a of the blade portion 32 is curved to bulge outward from both ends of its width direction toward the center when viewed from the upper side (direction of arrow B in FIG. 1). The scraper 16 presses the tip 32a of the blade portion 32 thereof against the surface Q of the workpiece W and scrapes the surface Q with the tip 32a.

The control device 18 controls the operation of the robot 12. As illustrated in FIG. 2, the control device 18 is a computer including a processor 40, a memory 42, an I/O interface 44, an input device 46, and a display device 48. The processor 40 includes a CPU or GPU, or the like, and is communicatably connected to the memory 42, the I/O interface 44, the input device 46, and the display device 48 via a bus 50, and performs arithmetic processing for executing the scraping process while communicating with these components.

The memory 42 includes a RAM, a ROM, or the like, and temporarily or permanently stores various types of data used in the arithmetic processing executed by the processor 40 and various types of data generated during the arithmetic processing. The I/O interface 44 includes, for example, an Ethernet (trade name) port, a USB port, an optical fiber connector, or an HDMI (trade name) terminal, and performs wired or wireless data communication with an external apparatus under a command from the processor 40. In the present embodiment, each of the servo motors 34 of the robot 12 and the force sensor 14 are communicably connected to the I/O interface 44.

The input device 46 includes a keyboard, a mouse, a touch panel, or the like and allows the operator to input data. The display device 48 includes a liquid crystal display, an organic EL display, or the like and visibly displays various types of data under a command from the processor 40. The input device 46 or the display device 48 may be integrally incorporated in a housing of the control device 18, or may be externally mounted at the housing of the control device 18 as a component separate from the housing.

As illustrated in FIG. 1, the robot 12 is provided with the robot coordinate system C1. The robot coordinate system C1 is a coordinate system configured to control the operation of each movable element of the robot 12 and is fixed with respect to the robot base 20. In the present embodiment, the robot coordinate system C1 is set with respect to the robot 12 such that the origin of the robot coordinate system C1 is arranged at the center of the robot base 20 and the z-axis of the robot coordinate system C1 coincides with the turning axis of the turning body 22.

On the other hand, the scraper 16 is provided with a tool coordinate system C2. The tool coordinate system C2 is a coordinate system that specifies a position and an orientation of the scraper 16 (or wrist flange 28b) in the robot coordinate system C1. In the present embodiment, the tool coordinate system C2 is set with respect to the scraper 16 such that the origin of the tool coordinate system C2 (so-called TCP) thereof is arranged at the center of the tip 32a of the blade portion 32 in a state where the handle portion 30 is not bending and the z-axis of the tool coordinate system C2 is parallel to the axis line A2 (or a normal direction of the curved surface of the tip 32a at the center of the tip 32a).

When moving the scraper 16, the processor 40 of the control device 18 sets the tool coordinate system C2 in the robot coordinate system C1, and generates a command (position command, speed command, torque command, or the like) to each servo motor 34 of the robot 12 such that the scraper 16 is arranged at a position and an orientation represented by the set tool coordinate system C2.

Thus, the processor 40 positions the scraper 16 in any position and any orientation in the robot coordinate system C1, thereby executing the scraping process. In this way, in the present embodiment, the processor 40 functions as a robot controller 52 (FIG. 2) configured to control an operation of the robot 12 to execute the scraping process.

On the other hand, the force sensor 14 is provided with a sensor coordinate system C3. The sensor coordinate system C3 is a coordinate system that defines a direction of a force acting on the force sensor 14. In the present embodiment, the sensor coordinate system C3 is set with respect to the force sensor 14 such that the origin of the sensor coordinate system C3 is arranged at the center of the force sensor 14 and the z-axis of the sensor coordinate system C3 coincides with the wrist axis A1 (or the x-axis of the sensor coordinate system C3 is parallel to the z-axis of the tool coordinate system C2).

Figure 4:
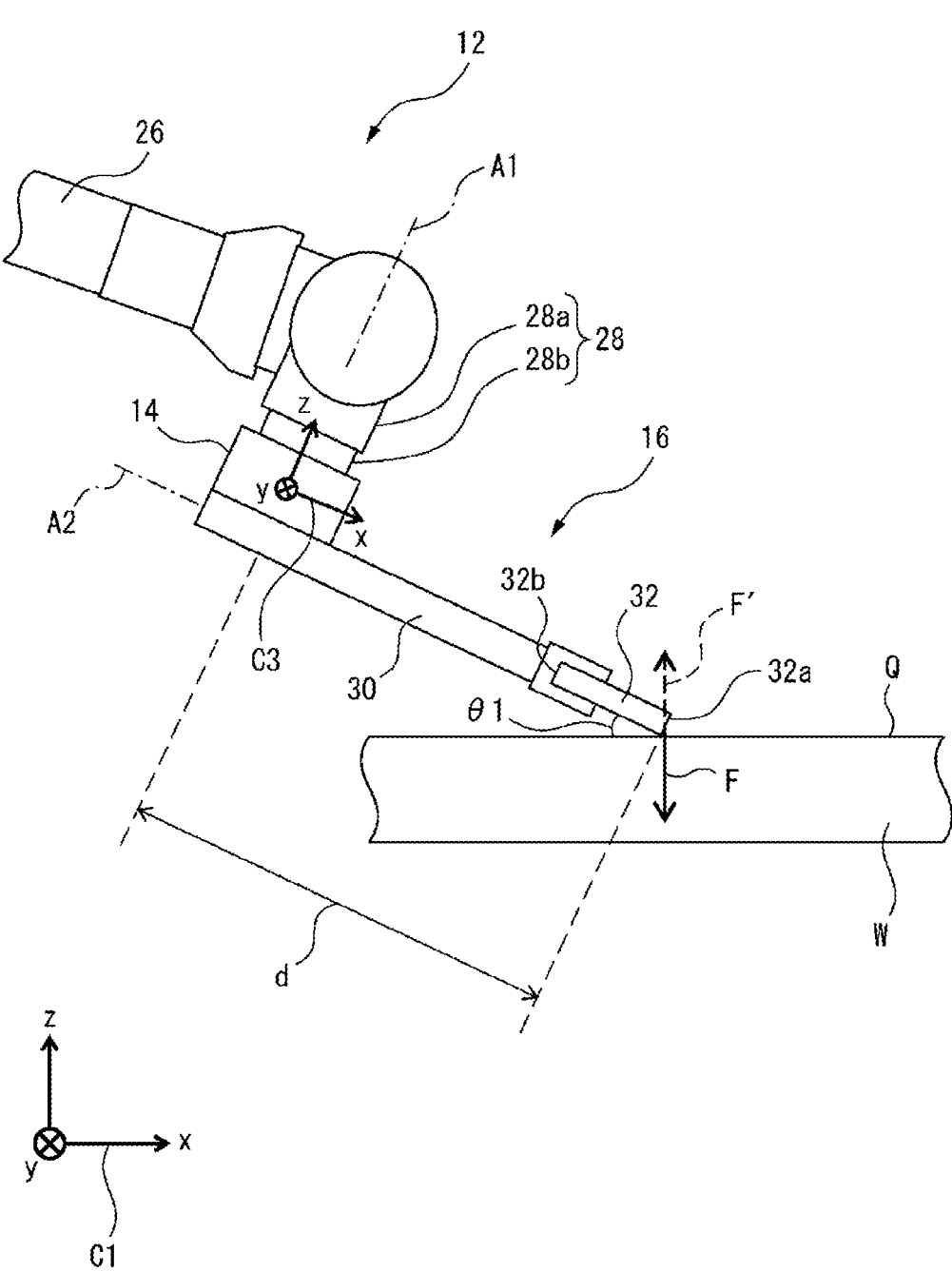
FIG. 4 illustrates a state where the scraper illustrated in FIG. 1 is pressed against the surface of a workpiece.

FIG. 4 illustrates a state where the robot 12 brings the tip 32a of the blade portion 32 of the scraper 16 into contact with the surface Q of the workpiece W. When the robot 12 presses the tip 32a of the scraper 16 against the surface Q in a direction orthogonal to the surface Q with the pressing force F, the reaction force F' of the pressing force F is applied from the surface Q to the force sensor 14 via the scraper 16.

Each of the strain gauges of the force sensor 14 transmit detection data corresponding to the force acting on the force sensor 14 at this time to the control device 18. Based on the detection data received from the force sensor 14 via the I/O interface 44, the processor 40 acquires forces f in the x-axis direction, the y-axis direction, and the z-axis direction of the sensor coordinate system C3, and the torques $\tau$ around the x-axis direction, the y-axis direction, and the z-axis direction, acting on the force sensor 14 at this time. The processor 40 calculates the magnitude of the reaction force F' acting on the tip 32a of the blade portion 32 in a direction orthogonal to the surface Q1 based on the forces f, the torques $\tau$, and condition data CD of the scraper 16 at this time.

The condition data CD includes, for example, at least one of an angle $\theta1$ between the axis line A2 and the surface Q, a distance d from the wrist axis A1 (or the origin of the sensor coordinate system C3) to the tip 32a of the blade portion 32, a position data indicating the position and the orientation of the tool coordinate system C2 (or the sensor coordinate system C3) in the robot coordinate system C1, and a bending data (e.g., a bending amount or an elastic modulus, of the handle portion 30) of the handle portion 30. In this way, the force sensor 14 detects the reaction force F' as the pressing force F, and the control device 18 can acquire the magnitude of the pressing force F (reaction force F') based on the detection data of the force sensor 14.

Next, the scraping process executed by the robot 12 will be described with reference to FIGS. 5 to 7. As illustrated in

6

Figure 5:
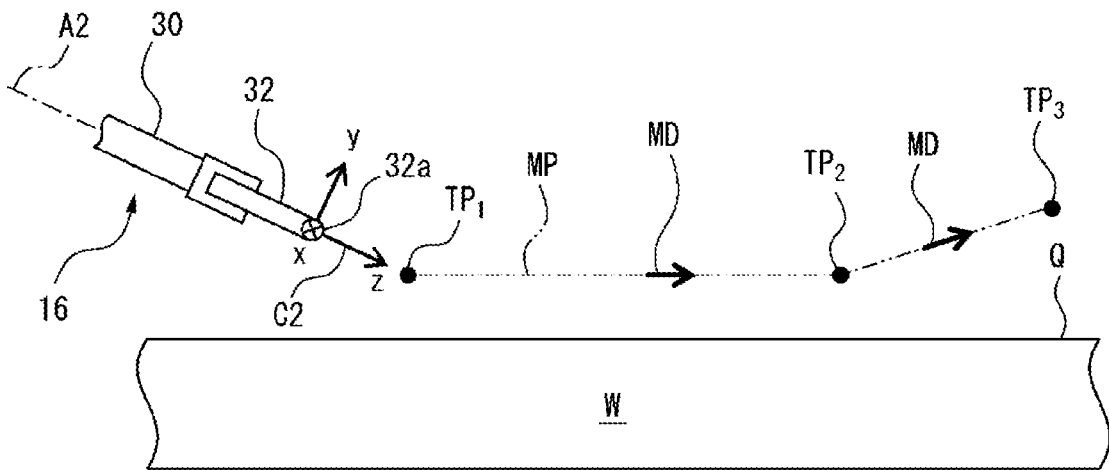
FIG. 5 illustrates an example of teaching points set with respect to the surface of a workpiece.
Figure 5:
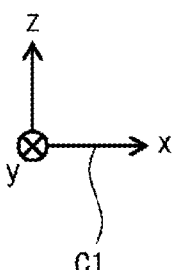
Figure 6:
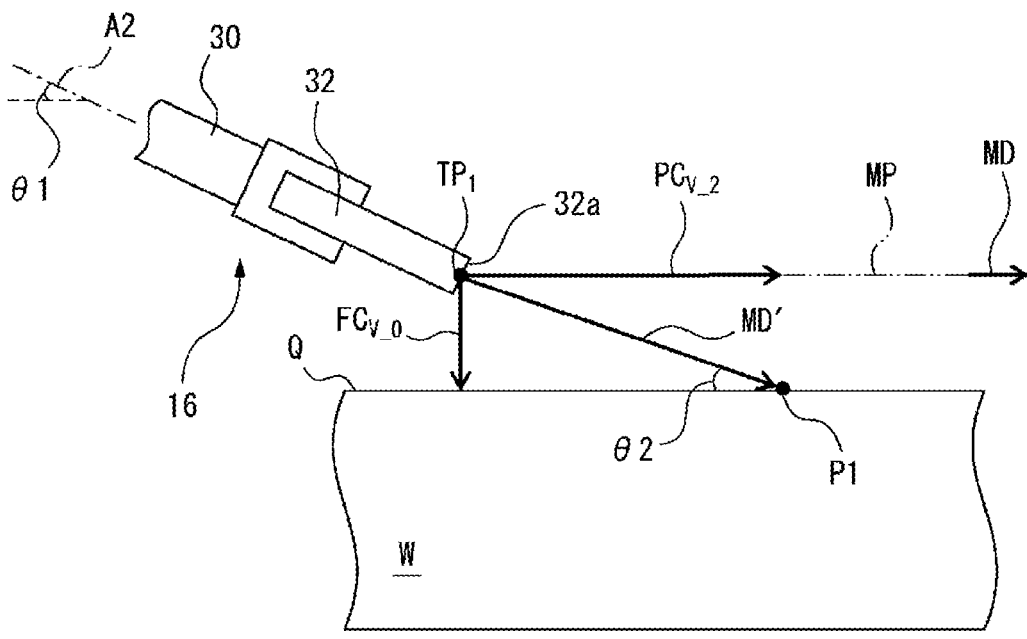
FIG. 6 is a diagram explaining a speed command as a position control command and a speed command as a force control command.
Figure 6:
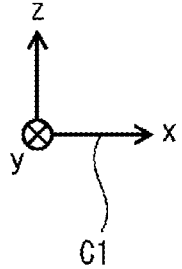

FIG. 5, a plurality of teaching points $TP_1$, $TP_2$ and $TP_3$ where the tip 32a (i.e., TCP) of the scraper 16 is to be positioned for executing the scraping process are set along the surface Q of the workpiece W positioned at a known position in the robot coordinate system C1.

In the present embodiment, a teaching point $TP_2$ is set at a position separated rightward from the teaching point $TP_1$, and the teaching point $TP_3$ is set at a position separated toward the upper right of the teaching point $TP_2$. The positions of respective teaching points $TP_1$ and $TP_2$ in the z-axis direction of the robot coordinate system C1 are substantially identical to each other. These teaching points $TP_n$ (n=1, 2, 3) are represented by coordinates in the robot coordinate system C1.

When performing the scraping process, the processor 40 starts a position control and generates a position control command $PC_n$ to move the scraper 16 to a teaching point $TP_n$ by the robot 12. The processor 40 positions the scraper 16 in the order of teaching points $TP_1 \rightarrow TP_2 \rightarrow TP_3$ by operating each servo motor 34 of the robot 12 according to this position control command $PC_n$. With this position control, the processor 40 moves the scraper 16 (specifically, tip 32a) along a movement path MP defined by the plurality of teaching points $TP_n$.

In the present embodiment, for ease of understanding, it is assumed that the surface Q of the workpiece W is substantially parallel to the x-y plane of the robot coordinate system C1, and a direction MD of the movement path MP is substantially parallel to the x-z plane of the robot coordinate system C1. A position control command $PC_n$ includes a speed command $PC_{V\_n}$ that specifies a speed $V_{P\_n}$ at which the scraper 16 (i.e., wrist flange 28b of the robot 12) is moved to the teaching point $TP_n$.

After starting the position control, the processor 40 moves the scraper 16 to the teaching point $TP_1$ by operating the robot 12 according to a position control command $PC_1$. When the tip 32a of the scraper 16 is arranged at the teaching point $TP_1$, as illustrated in FIG. 6, the tip 32a separates upward from the surface Q.

When the scraper 16 reaches the teaching point $TP_1$, the processor 40 starts a force control. After starting the force control, the processor 40 controls the position of the wrist flange 28b (or TCP) of the robot 12 based on the detection data of the force sensor 14 such that the pressing force F at which the robot 12 presses the scraper 16 against the surface Q of the workpiece W is controlled to a target value $F_T$.

Specifically, in the force control, the processor 40 generates a force control command FC for controlling the position of the wrist flange 28b (TCP) of the robot 12 in order to control the pressing force F (specifically, reaction force F') acquired based on the detection data of the force sensor 14 to the target value $F_T$. The processor 40 then adds the force control command FC to the position control command $PC_n$ to operate the servo motors 34 of the robot 12.

Accordingly, the processor 40 moves the scraper 16 (or the wrist flange 28b) in the direction MD of the movement path MP according to the position control command $PC_n$, and moves the scraper 16 in the direction (i.e., the z-axis direction of the robot coordinate system C1) approaching to or separating from the surface Q of the workpiece W according to the force control command FC. The force control command FC includes a speed command FCv specifying the speed at which the scraper 16 is moved in the z-axis direction of the robot coordinate system C1.

When the scraper 16 reaches the teaching point $TP_1$, the processor 40 generates a speed command $PC_{V\_2}$ as a position control command $PC_2$ to move the scraper 16 to the teaching point $TP_2$, and generates a speed command $FC_{V\_0}$ as the force control command FC. FIG. 6 schematically illustrates the speed commands $PC_{V\_2}$ and $FC_{V\_0}$ generated by the processor 40 when the scraper 16 reaches the teaching point $TP_1$.

After the scraper 16 has reached the teaching point $TP_1$, the processor 40 causes the robot 12 to operate in accordance with the speed command $PC_{V\_2}$ to move the scraper 16 toward the teaching point $TP_2$ in the direction MD in a speed $V_{P\_2}$ corresponding to (specifically, coinciding with) the speed command $PC_{V\_2}$.

Along with this, the processor 40 generates the speed command $FC_{V\_0}$ to control the pressing force F to the target value $F_T$, and by adding the generated speed command to the speed command $PC_{V\_2}$ to the servo motors 34, moves the scraper 16 in the direction toward the surface Q (i.e., downward) with a speed $V_{F\_0}$ corresponding to (specifically, coinciding with) the speed command $FC_{V\_0}$. As a result, the robot 12 moves the scraper 16 in the direction MD' in FIG. 6 after passing through the teaching point $TP_1$.

Figure 7:
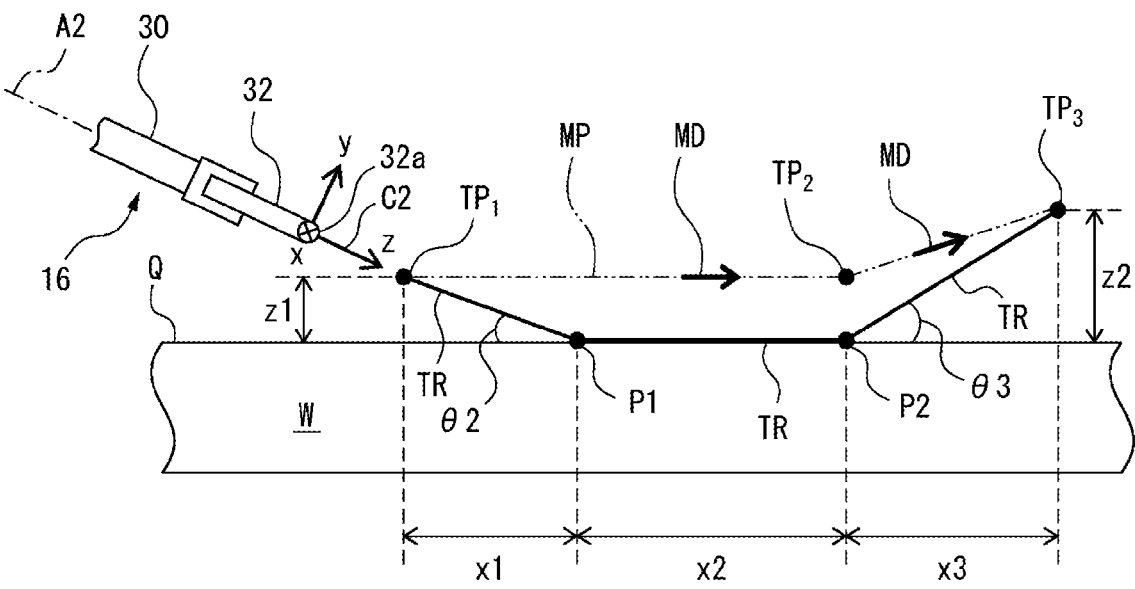
FIG. 7 illustrates an example of a trajectory in which the scraper actually moves during a scraping process.
Figure 7:
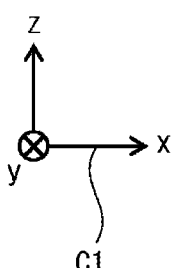

FIG. 7 illustrates with a solid line an actual trajectory TR that is followed by the scraper 16 (specifically, tip 32a) in a scraping process. After passing through the teaching point $TP_1$, the scraper 16 moves toward the surface Q in the trajectory TR inclined to form an angle $\theta 2$ with respect to the surface Q and contacts the surface Q at a position P1.

Here, when the distances between the teaching point $TP_1$ and a position P1 in FIG. 7, in the x axis and z-axis directions of the robot coordinate system C1, are a distance x1 and a distance z1, respectively, the distance x1 and the distance z1, the speed command $PC_{V\_2}$ (speed $V_{P\_2}$), and the speed command $FC_{V\_0}$ (speed $V_{F\_0}$) satisfy the following equation (1):

$$Z1/x1 = FC_{V\_0}/PC_{V\_2} = V_{F\_0}/V_{P\_2} \qquad (1)$$

Further, the angle $\theta 2$, the distance x1 and the distance z1, the speed command $PC_{V\_2}$ (speed $V_{P\_2}$), and the speed command $FC_{V\_0}$ (speed $V_{F\_0}$) satisfy the following equation (2):

$$\theta 2 = \tan^{-1}(z1/x1) = \tan^{-1}(FC_{V\_0}/PC_{V\_2}) = \tan^{-1}(V_{F\_0}/V_{P\_2}) \qquad (2)$$

Thus, when assuming that a machining condition MC of the scraping process is set to x1=10 mm and z1=5 mm, it can be determined from the equation (2) that angle $\theta 2 \approx 26.6$ degrees. In this case, when the speed $V_{P\_2}$ (i.e. speed command $PC_{V\_2}$) is set to 100 mm/sec as the machining condition MC, the speed $V_{F\_0}$ (i.e., speed command $FC_{V\_0}$) can be determined as 50 mm/sec from equation (1).

While the scraper 16 is in contact with the surface Q, the processor 40 moves the scraper 16 in the direction MD (i.e., rightward) according to the position control command $PC_2$ and generates the speed command $FC_{V\_1}$ as the force control command FC for controlling the pressing force F to the target value $F_T$ by the force control.

In accordance with this speed command $FC_{V\_1}$, the position of the wrist flange 28b of the robot 12 is shifted in the z-axis direction of the robot coordinate system C1 at a speed $V_{F\_1}$ corresponding to (specifically, coinciding with) the speed command $FC_{V\_1}$. Here, the maximum value of the speed command $FC_{V\_1}$ (i.e., speed $V_{F\_1}$) generated while the scraper 16 is in contact with the surface Q can be set to be larger than the speed command $FC_{V\_0}$ (i.e., speed $V_{F\_0}$) generated before the scraper 16 contacts the surface Q.

Figure 8:
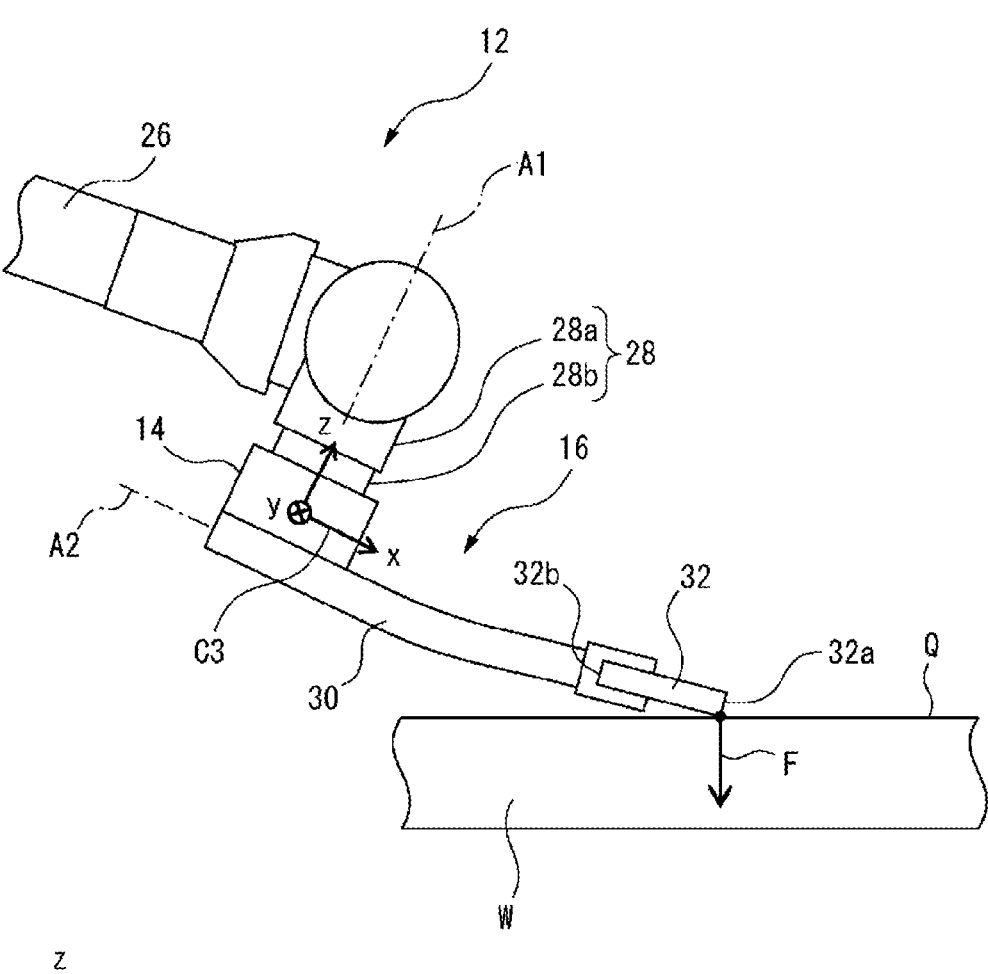
FIG. 8 schematically illustrates a state of a handle portion of the scraper during the scraping process.
Figure 8:
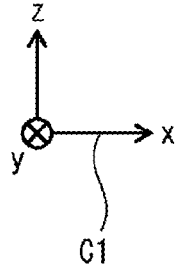

Thus, the scraper 16 is moved rightward along the surface Q while being pressed with the pressing force F of a magnitude corresponding to the target value $F_T$, thereby the scraping process that scrapes the surface Q by the tip 32a of the scraper 16 is executed. FIG. 8 illustrates a state of the scraper 16 during the scraping process. As illustrated in FIG. 8, during scraping process, the robot 12 presses the tip 32a of the scraper 16 against the surface Q at the pressing force F, which causes the handle portion 30 of the scraper 16 to bend and curve to bulge downward. In other words, the target value $F_T$ of the force control is set as a value by which the handle portion 30 can be bent during scraping process.

Again referring to FIG. 7, when the scraper 16 (or the wrist flange 28b) reaches a position corresponding to the teaching point $TP_2$, the processor 40 terminates the force control and generates a position control command $PC_3$ to move the scraper 16 to the teaching point $TP_3$. The processor 40 then moves the scraper 16 to the upper right toward the teaching point $TP_3$ by operating the robot 12 according to the position control $PC_3$.

As a result, the scraper 16 moves toward the upper right in the trajectory TR inclined to form an angle $\theta 3$ with respect to the surface Q of the workpiece W, and the tip 32a of the scraper 16 separates away from the surface Q at a position P2. Thus, the scraper 16 scrapes the surface Q from the position P1 to the position P2 over a distance x2 and the scraping process ends. In the present embodiment, it is assumed that the coordinate of the position P2 in the x-axis direction of the robot coordinate system C1 is substantially identical to the teaching point $TP_2$. Then scraper 16 then reaches the teaching point $TP_3$.

Here, when the distance in the x-axis direction of the robot coordinate system C1 between the teaching point $TP_2$ (or, position P2) and the teaching point $TP_3$ in FIG. 7 is a distance x3, and the distance of the z-axis direction of the robot coordinate system C1 between the position P2 and the teaching point $TP_3$ is a distance z2, in the present embodiment, the distances x3 and z2 satisfy the following equation (3):

$$\theta 3 = \tan^{-1}(z2/x3) \qquad (3)$$

Figure 9:
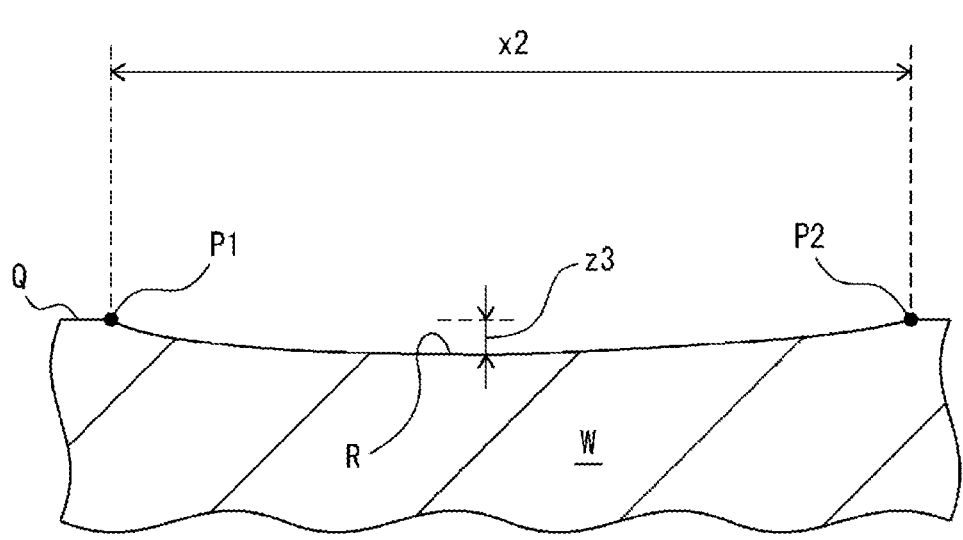
FIG. 9 schematically illustrates a recess formed by the scraping process.
Figure 9:
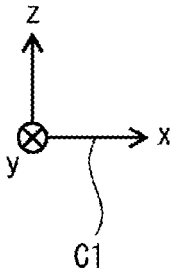
Figure 10:
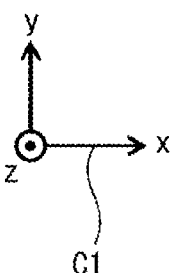
FIG. 10 schematically illustrates a recess formed by the scraping process.

With the scraping process executed in this manner, a recess R that is a curving concave is formed on the surface Q so as to extend rightward from the position P1 to the position P2, as illustrated in FIGS. 9 and 10. In the examples illustrated in FIGS. 9 and 10, the recess R has, in the robot coordinate system C1, a length x2 in the x-axis direction a width y1 in the y-axis direction, and a depth z3 in the z-axis direction.

In FIG. 9, the depth z3 of the recess R is illustrated enlarged for ease of understanding, but it should be understood that the depth z3 of the actual recess R is about 10 μm or less. Additionally, as illustrated in FIG. 10, in the recess R, a midpoint P3 of the line connecting the position P1 and the position P2 is defined. Each of the position P1, the position P2, and the midpoint P3 becomes a reference point RP indicating the position of the recess R in the robot coordinate system C1.

The processor 40 forms a plurality of recesses R on the surface Q of the workpiece W by repeatedly executing the scraping process as described above. Here, in the present embodiment, the processor 40 determines the positions of the plurality of recesses R to be formed on the surface Q by the scraping process. This function will be described below.

First, the processor 40 receives an input of shape information SI of the surface Q. As an example of the input of the shape information SI, the operator inputs, by operating the input device 46 of the control device 18, the coordinate P (x, y, z) in the robot coordinate system C1 of each apex of the surface Q and information SID for specifying the shape (quadrangle, octagon, trapezoid, or the like) of the surface Q as the shape information SI.

Figure 11:
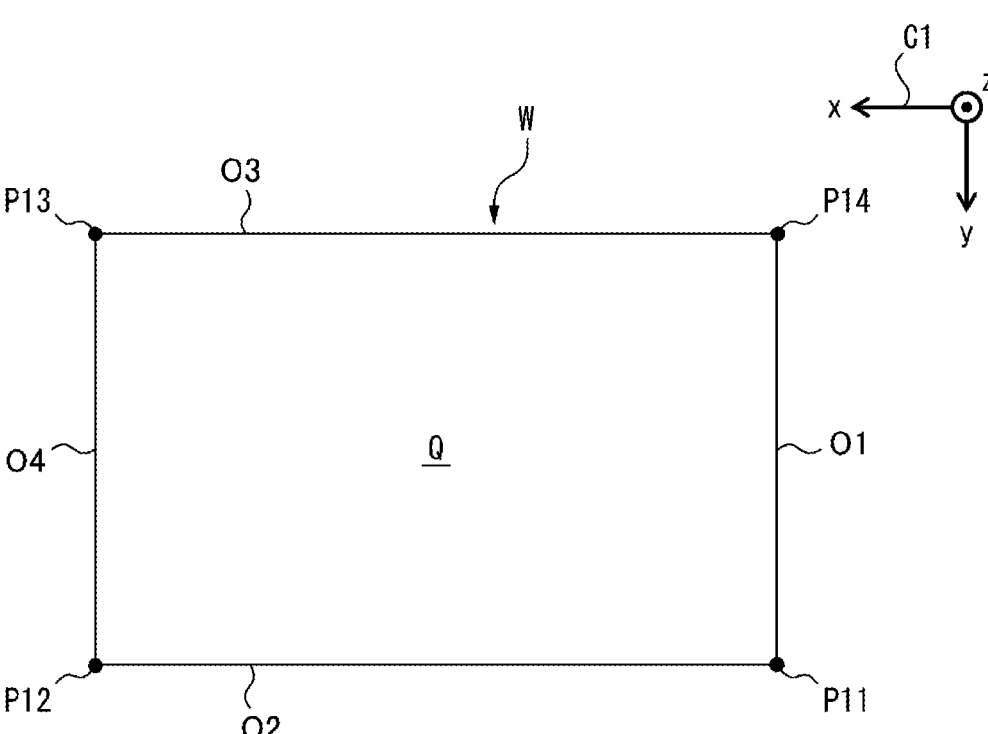
FIG. 11 illustrates an example of a shape of the surface of a workpiece.

FIG. 11 illustrates an example of the surface Q of the workpiece W. In the case of the example illustrated in FIG. 11, the operator inputs, by operating the input device 46, as the shape information SI, the coordinates P11 $(x_{11}, y_{11}, z_{11})$, P12 $(x_{12}, y_{12}, z_{12})$, P13 $(x_{13}, y_{13}, z_{13})$, and P14 $(x_{14}, y_{14}, z_{14})$ in the robot coordinate system C1 of each apex P11, P12, P13, and P14 of the rectangular surface Q.

The operator also inputs, by operating the input device 46, as the information SID for specifying the shape of the surface Q, an order of each apex P11, P12, P13 and P14 to make the processor 40 recognize the order. In the case of the example illustrated in FIG. 11, the operator inputs the order of the apexes P11→P12→P13→P14→P11 to make the processor 40 recognize the order. The processor 40 then recognizes the shape of the rectangular surface Q in the robot coordinate system C1, by drawing virtual lines in the order of the apexes P11→P12→P13→P14.

Alternatively, the operator may input, as the information SID for specifying the shape, information for specifying an apex as the start point of the shape recognition and information for specifying directions for recognizing the other apexes. For example, in the case of the example illustrated in FIG. 11, it is assumed that the operator inputs information for setting the apex P11 as the start point and causing the other apexes P12, P13 and P14 to be recognized sequentially in "clockwise direction" when viewed from above.

In this case, the processor 40 can recognize the shape of the rectangular surface Q by drawing a virtual line in the order of the apexes P11→P12→P13→P14→P11, with the apex P11 as the start point. Note that "counterclockwise direction" may be specified as information for specifying the direction for recognizing the other apexes. In this case, the processor 40 recognizes each apex in the order of the apexes P11→P14→P13→P12→P11, with the apex P11 as the start point.

Figure 12:
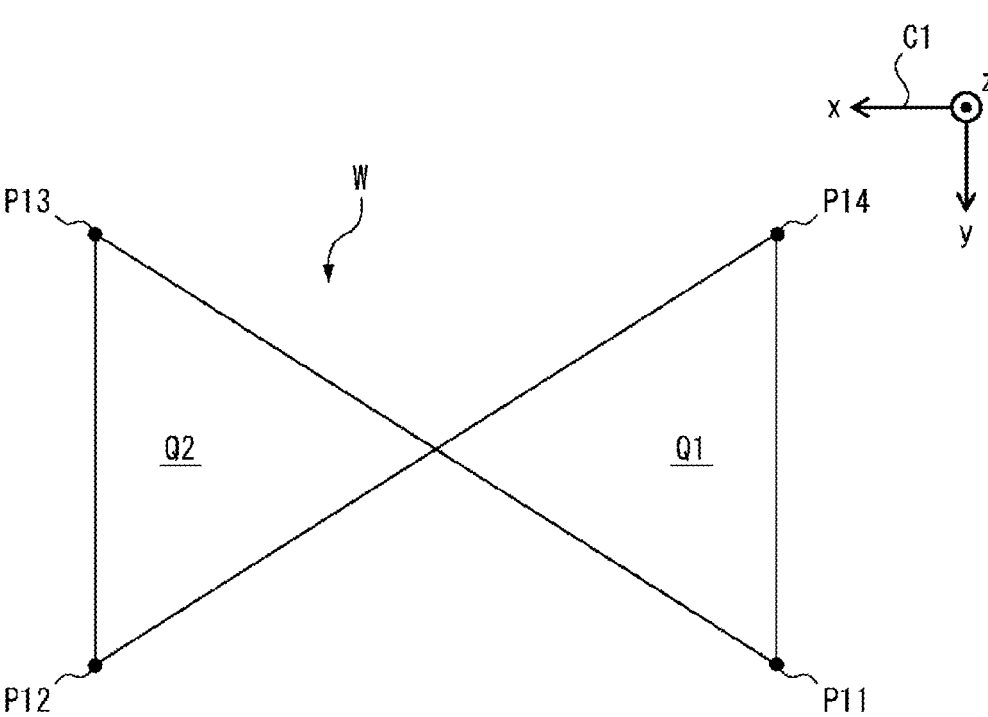
FIG. 12 illustrates another example of a shape of the surface of a workpiece.

In the example illustrated in FIG. 12, the operator inputs, as the information SID for specifying the shape of the surface Q, the order of the apexes P11→P13→P12, P14, P11. The processor 40 then recognizes the surface Q of the workpiece W as two triangular surfaces Q1 and Q2, as illustrated in FIG. 12.

Figure 13:
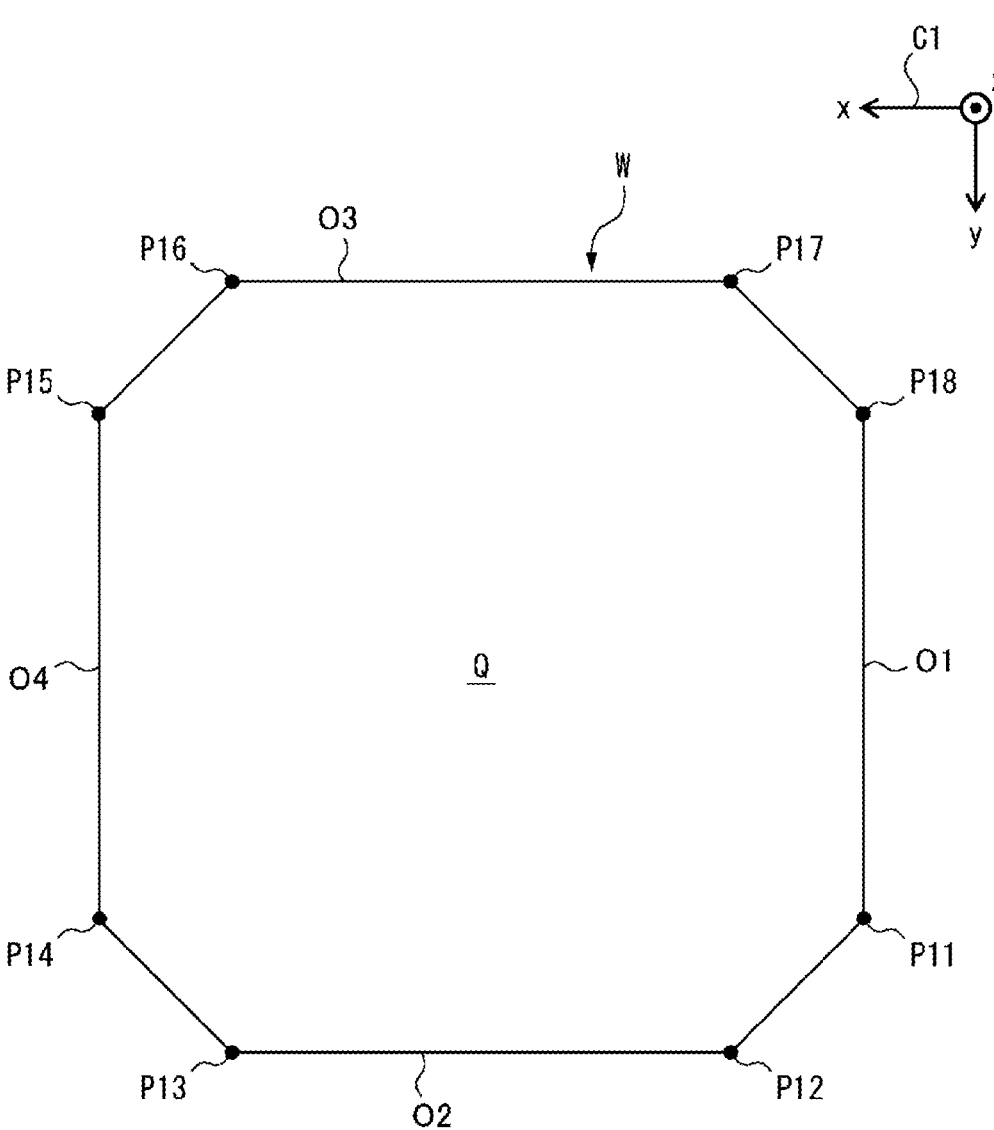
FIG. 13 illustrates still another example of a shape of the surface of a workpiece.

In the example illustrated in FIG. 13, the operator inputs the coordinates P11 $(x_{11}, y_{11}, z_{11})$ to P18 $(x_{18}, y_{18}, z_{18})$ in the robot coordinate system C1 of respective apexes P11 to P18 of the octagonal surface Q as the shape information SI, and inputs the information SID for specifying the order of the apexes P11→P12→P13→P14→P15→P16→P17→P18→P11. The processor 40 then recognizes the octagonal surface Q illustrated in FIG. 13. Thus, by inputting the coordinate of each apex of the shape of the surface Q and the information SID for designating the shape, as the shape information SI, the operator can cause the processor 40 to recognize the surface Q of various shapes.

As another example of inputting shape information SI, the operator inputs, by operating the input device 46, the drawing data (CAD data) of the workpiece W from an external apparatus (e.g., a CAD device or an external memory) into the control device 18 as the shape information SI, and inputs information for specifying the positional relationship between a model coordinate system C4 that specifies the position of the drawing data and the robot coordinate system C1.

Alternatively, when the drawing data of the workpiece W is stored in the memory 42 in advance, the operator may input, by operating the input device 46, information for specifying the drawing data of the workpiece W stored in the memory 42 as the shape information SI and information for specifying the positional relationship between the model coordinate system C4 of the drawing data and the robot coordinate system C1.

As still another example of inputting the shape information SI, the robot system 10 further includes a vision sensor (not illustrated) that can image an object, and the vision sensor may input, as the shape information SI of the surface Q, the image data imaging the surface Q of the workpiece W into the control device 18. Specifically, the vision sensor is, for example, a three-dimensional vision sensor or a two-dimensional camera, which is attached at a known position in the robot 12 and moved by the robot 12, or fixed at a known position in the robot coordinate system C1. The processor 40 can receive the input of shape information SI (image data) from the vision sensor and acquire the coordinates of the surface Q in the robot coordinate system C1.

Thus, the processor 40 receives the input of the shape information SI through the input device 46 (or a vision sensor). Consequently, in the present embodiment, the processor 40 functions as an input receiving section 54 (FIG. 2) that receives the input of the shape information SI. The processor 40 acquires the position (i.e., the coordinate, of apex and end edge) of the surface Q in the robot coordinate system C1 based on the shape information SI that has been input. Thus, the position of the surface Q in the robot coordinate system C1 is known.

The processor 40 also receives the input of pattern information PI that determines how the plurality of recesses R to be formed on the surface Q are arranged on the surface Q. The pattern information PI includes, for example, design information PI1, pitch information PI2, angle information PI3, and offset information PI4. The design information PI1 is information for specifying the type of design for arranging a plurality of recesses R to align in a lattice pattern in a row direction G and a column direction H which are defined on the surface Q.

Figure 14:
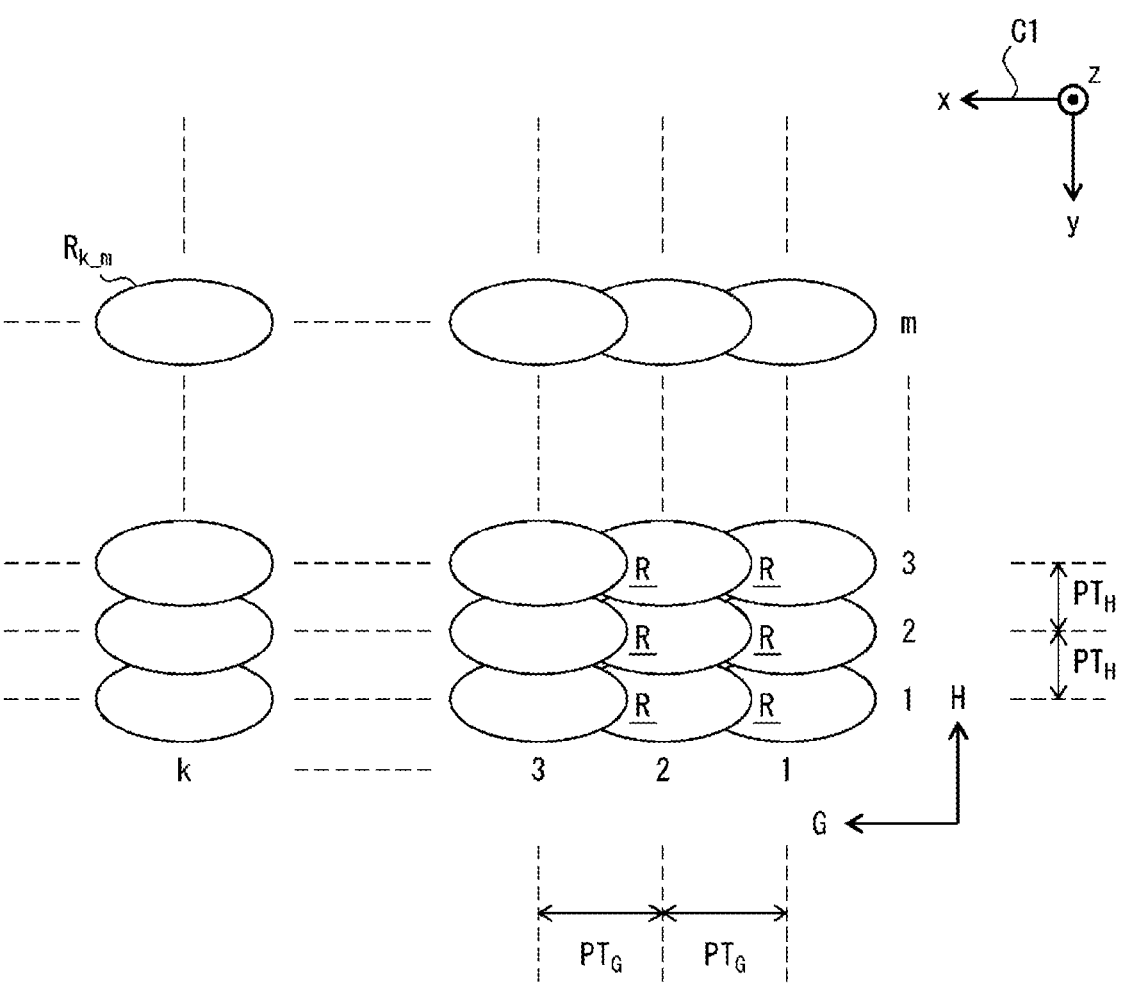
FIG. 14 illustrates a translational design specified by design information.

FIG. 14 illustrates a translational design as an example of the design. In the translational design illustrated in FIG. 14, a plurality of recesses R are arranged in a lattice pattern in the row direction G and the column direction H, which are orthogonal to each other. In the example illustrated in FIG. 14, the row direction G and the column direction H are defined parallel to the x-axis direction and y-axis direction of the robot coordinate system C1, respectively. The recess $R_{k\_m}$ in FIG. 14 represents a recess R in the k-th row and m-th column. In the translational design illustrated in FIG. 14, the positions of the respective reference points RP (position P1, position P2, midpoint P3) of the recesses R aligned in the row direction G coincide with each other in the column direction H, and the positions of the respective reference points RP of the recesses R aligned in the column direction H coincide with each other in the row direction G.

Figure 15:
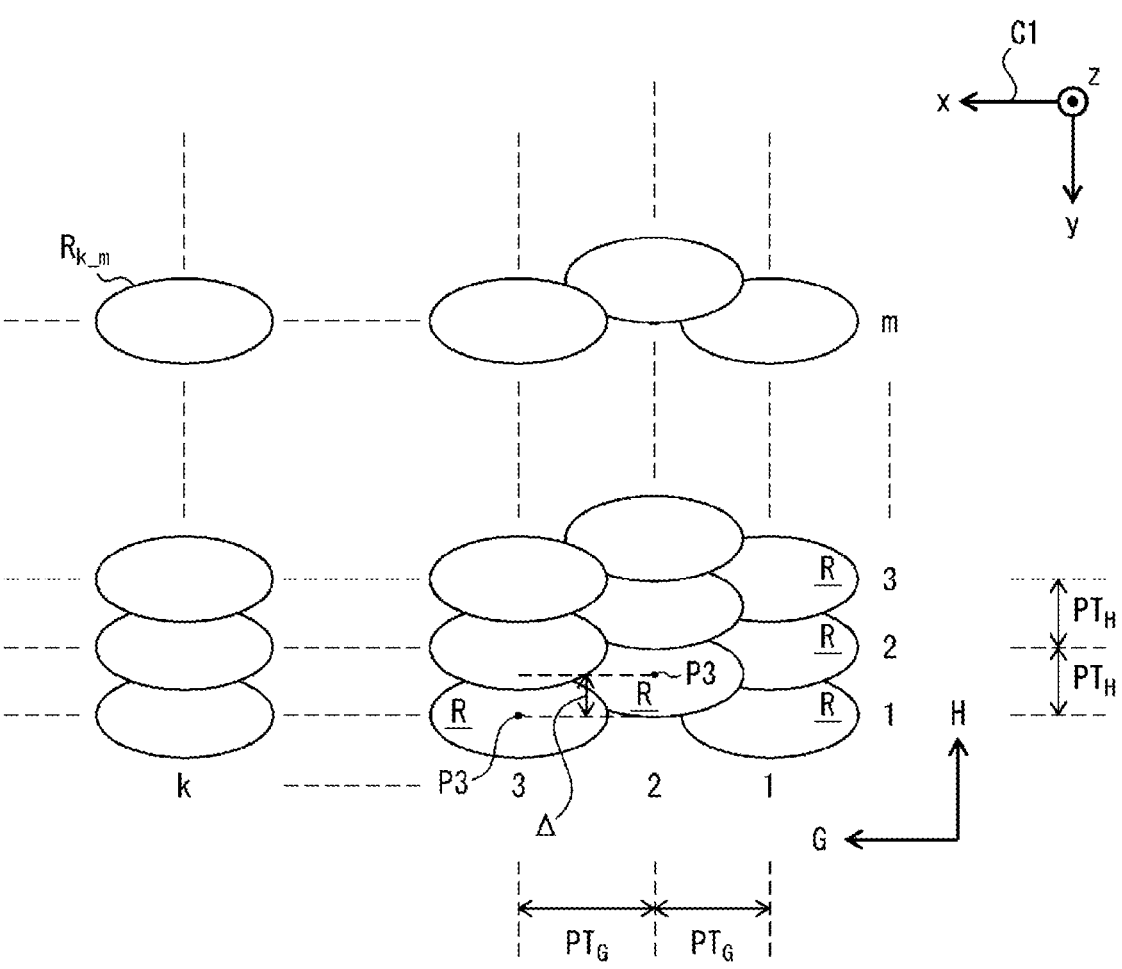
FIG. 15 illustrates a staggered design specified by design information.

FIG. 15 illustrates a staggered design as another example of the design. In the staggered design illustrated in FIG. 15, a plurality of recesses R are arranged to align in a lattice pattern in the row direction G and the column direction H, in which the positions of the respective reference points RP of the recesses R aligned in the column direction H coincide with each other in the row direction G, while the positions of the respective reference points RP of the recesses aligned with the row direction G alternately is displaced in the column direction H by a displacement amount Δ. The design information PI1 is used for specifying a design type such as "translational design" or "staggered design" described above.

Pitch information PI2 is information for setting a pitch $PT_G$ between two recesses R adjacent to each other in the row direction G and a pitch $PT_H$ between two recesses R adjacent to each other in the column direction H, in the design (e.g., a translational design or a staggered design) specified by the design information PI1.

In the staggered design illustrated in FIG. 15, the displacement amount Δ of the reference points RP (e.g., midpoints P3) of the two recesses R adjacent in the row direction G may be determined as a value obtained by multiplying the pitch $PT_H$ in the column direction H by a predetermined coefficient ρ ($0 \leq ρ < 1$). In the example illustrated in FIG. 15, ρ=0.5 (i.e., $Δ = PT_H/2$). This coefficient ρ may be included in the design information PI1 or pitch information PI2.

The angle information PI3 is information for setting the angle θ4 of the row direction G or column direction H with respect to the reference direction. This angle θ4 will be described with reference to FIG. 16. In the example illustrated in FIG. 16, the workpiece W is positioned at a known position in the robot coordinate system C1 such that a longitudinal direction of the workpiece W is parallel to the x-axis direction of the robot coordinate system C1. In this case, for example, when the reference direction is defined as the x-axis direction of the robot coordinate system C1, in the example illustrated in FIG. 16, it is defined such that the row direction G is inclined by an angle θ4 with respect to the reference direction (x-axis direction).

Figure 16:
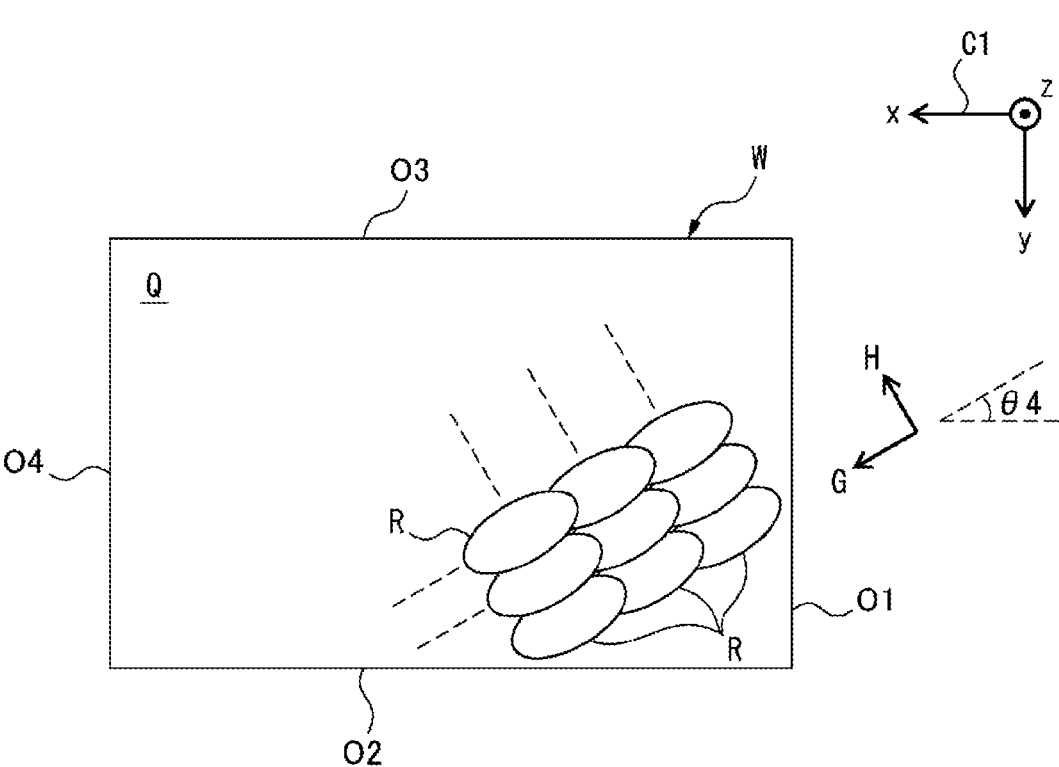
FIG. 16 is a diagram for explaining an angle set by angle information.

When the row direction G and the column direction H are defined in this way, the plurality of recesses R are arranged in a lattice pattern to align in the row direction G and column direction H that are inclined by the angle θ4 with respect to the reference direction (x-axis direction) as illustrated in FIG. 16. The angle information PI3 is used for setting the angle θ4 as described above. It will be understood that the angle θ4 may be defined as an angle of the column direction H with respect to the reference direction (x-axis direction), or may be defined with respect to the y-axis direction of the robot coordinate system C1 as the reference direction.

Once the design type, pitch PT, and angle θ4 are determined by the design information PI1, the pitch information PI2, and the angle information PI3, the positional relationship of the plurality of recesses R (specifically, reference points RP) on the surface Q can be uniquely determined. That is, when one recess R is arranged at an arbitrary position on the surface Q, the positions of the other recesses R can be uniquely determined.

The offset information PI4 is information for setting the offset distance δ between an end edge O of the surface Q and a recess R. This offset distance δ indicates the distance by which a recess R is shifted with respect to the adjacent end edge O of the surface Q when the position of the recess R is determined. This offset distance δ will be described with reference to FIG. 17.

Figure 17:
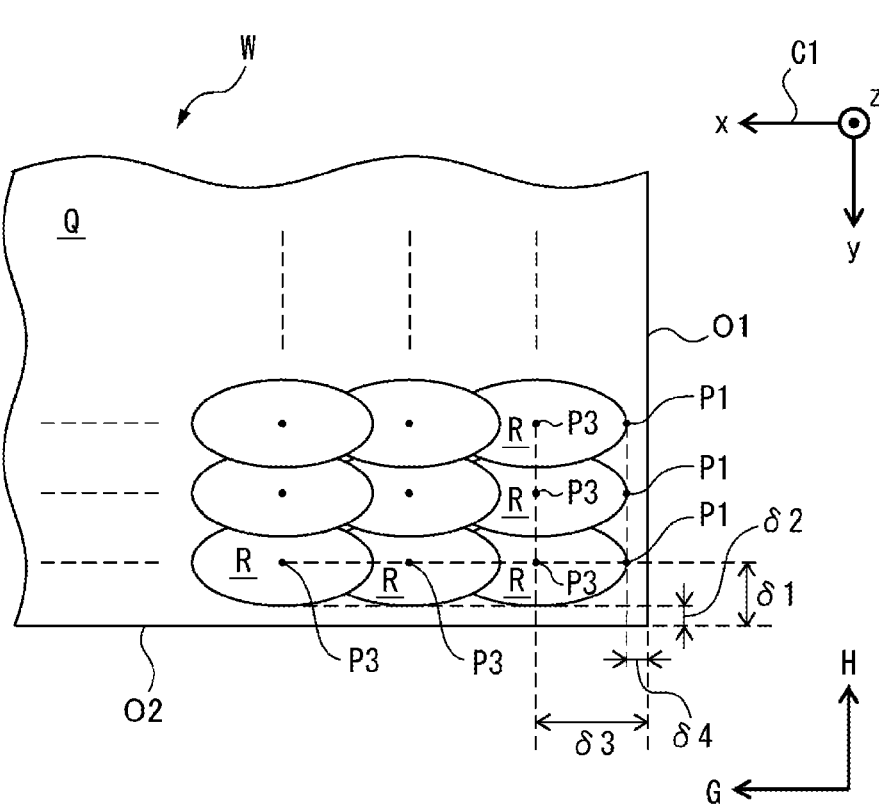
FIG. 17 is a diagram for explaining an offset distance set by offset information.

In the example illustrated in FIG. 17, an offset distance δ1 indicates the distance between a front end edge O2 of the surface Q and the position P1 (or midpoint P3) of the recess R adjacent to the front end edge O2. An offset distance δ2 indicates the minimum distance between the front end edge O2 and the outer edge of the recess R adjacent to the front end edge O2.

On the other hand, an offset distance δ3 indicates the distance between a left end edge O1 of the surface Q and the midpoint P3 of the recess R adjacent to the left end edge O1. An offset distance δ4 indicates the minimum distance between the left end edge O1 and the outer edge of the recess R adjacent to the left end edge O1 (i.e., the distance between the left end edge O1 and the position P1).

Although not illustrated, the offset distance δ1 may specify the distance between the rear end edge O3 (FIGS. 11 and 13) of the surface Q and the position P1 (midpoint P3) of the recess R adjacent to the rear end edge O3, and the offset distance δ2 may specify the minimum distance between a rear end edge O3 and the outer edge of the recess R adjacent to the rear end edge O3. The offset distance δ3 may also specify the distance between a right end edge O4 (FIGS. 11 and 13) of the surface Q and the midpoint P3 of the recess R adjacent to the right end edge O4, and the offset distance δ4 may specify the minimum distance between the right end edge O4, and the outer edge (i.e., position P2) or the position P1, of the recess R adjacent to the right end edge O4.

The operator inputs, by operating the input device 46 of the control device 18, the design information PI1, the pitch information PI2, the angle information PI3 and the offset information PI4, as the pattern information PI. The processor 40, functioning as the input receiving section 54, receives the input of the pattern information PI through the input device 46. Thus, the processor 40 obtains the shape information SI and the pattern information PI. Note that the processor 40 may cause the display device 48 to display an input screen for inputting the shape information SI or pattern information PI.

The processor 40 automatically determines the position of each recess R on the surface Q based on the shape information SI and pattern information PI which are received by the input from the operator. This function will be described below. As an example, it is assumed that the shape information of the rectangular workpiece W illustrated in FIG. 18 is input as the shape information SI.

In this case, based on the received design information PI1, the pitch information PI2, the angle information PI3 and the offset information PI4, the processor 40 determines the position of the reference point RP of each recess R in the region of the surface Q arranged at a known position in the robot coordinate system C1, and acquires the position data (coordinate) of the reference point RP in the robot coordinate system C1.

Figure 18:
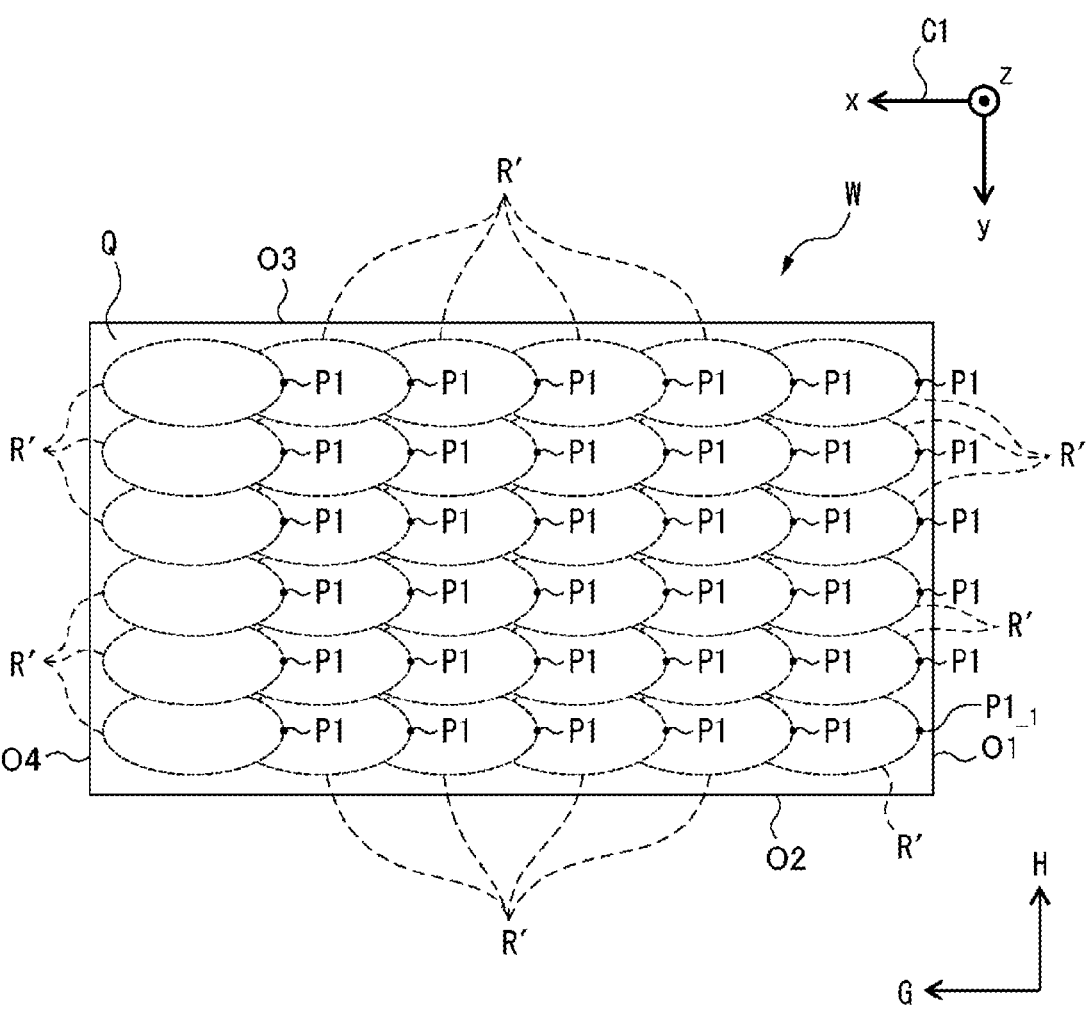
FIG. 18 illustrates an example of positions of a plurality of recesses determined as a translational design.

In the example illustrated in FIG. 18, the virtual occupied region of the recesses R whose reference points RP have been determined, is illustrated as dotted line region R'. FIG. 18 illustrates an example in which a translational design is specified as design information PI1 and θ4=0 degree is specified as the angle information PI3. For example, in the example illustrated in FIG. 18, it is assumed that the position P1 of the recess R is to be determined as the reference point RP.

In this case, in order to determine the positions P1 of the recesses R, the processor 40, for example, determines an initial position $P1_{-1}$ on the surface Q. The initial position $P1_{-1}$ can be determined as a position away from the front end edge O2 by the offset distance δ1 specified in the offset information PI4 and away from the left end edge O1 by the offset distance δ4.

Once the position of this initial position $P1_{-1}$ is determined, the processor 40 can automatically determine the other positions P1 as the points aligned in a translational design that satisfies the condition that the points are located within the region of the surface Q and separated from the respective end edges O1, O2, O3 and O4 by the offset distance δ1 and δ4 or more as specified in the offset information PI4. Thus, as illustrated in FIG. 18, positions of the positions P1 of the plurality of recesses R can be determined automatically on the surface Q.

Figure 19:
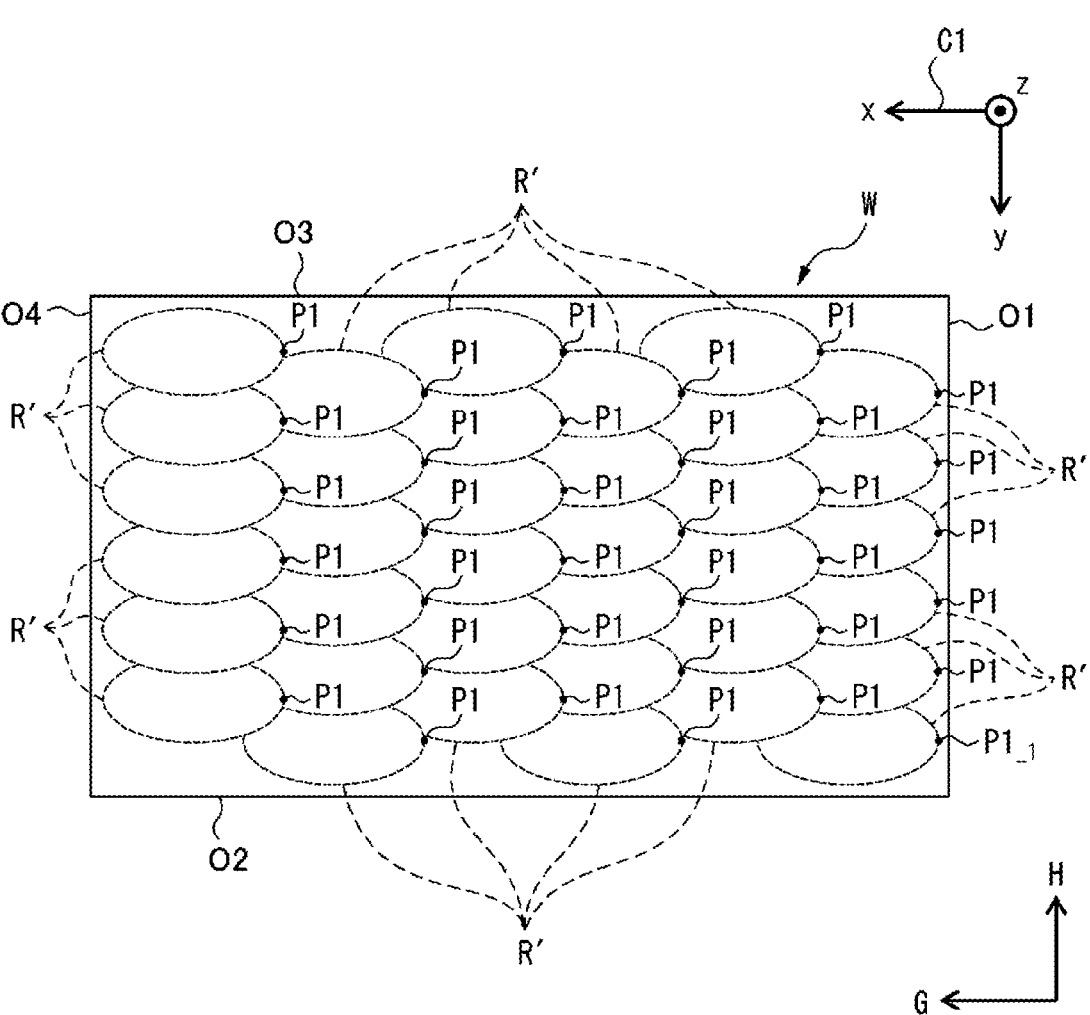
FIG. 19 illustrates an example of positions of a plurality of recesses determined as a staggered design.

FIG. 19 illustrates an example in which a staggered design is specified as the design information PI1 and $\theta4=0$ degree is specified as the angle information PI3. In the example illustrated in FIG. 19, the processor 40 determines, for example, the initial position $P1_{-1}$ as a position away from the front end edge O2 by the offset distance $\delta1$ and away from the left end edge O1 by the offset distance $\Delta4$. Once the initial position $P1_{-1}$ is determined, the processor 40 can automatically determine the other positions P1 from the pattern information PI.

Figure 20:
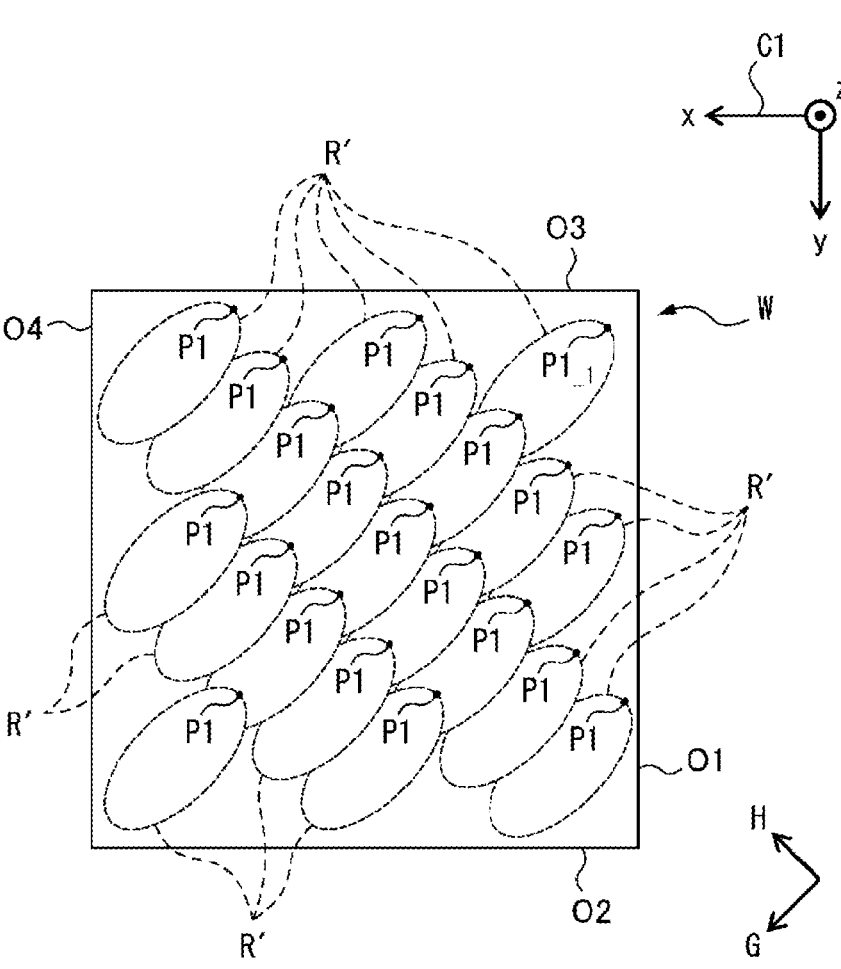
FIG. 20 illustrates an example of positions of a plurality of recesses determined as a translational design inclined at an angle of 45 degrees.

FIG. 20 illustrates an example in which a translational design is specified as the design information PI1 and $\theta4=45$ degrees is specified as the angle information PI3. In the example illustrated in FIG. 20, the processor 40 determines, for example, the initial position $P1_{-1}$ as a position away from the rear end edge O3 by the offset distance $\delta1$ and away from the left end edge O1 by the offset distance $\delta4$.

Once the initial position $P1_{-1}$ is determined, the processor 40 can automatically determine the other positions P1 from the pattern information PI. Thus, in the present embodiment, the processor 40 functions as a position determination section 56 (FIG. 2) that automatically determines the position of each recess R on the surface Q based on the shape information SI and the pattern information PI which are received by the input from the operator.

As described above, in the present embodiment, the processor 40 functions as the input receiving section 54 and the position determination section 56 to determine the positions (specifically, coordinates of positions P1) of the plurality of recesses R to be formed, by the robot 12, on the surface Q with the scraping process. Thus, the input receiving section 54 and the position determination section 56 constitute a device 60 (FIG. 2) that determines the positions of the plurality of recesses R to be formed on the surface Q by the scraping process. The device 60 can automatically determine the positions of the recesses R, which simplifies the task of launching the robot system 10.

Figure 21:
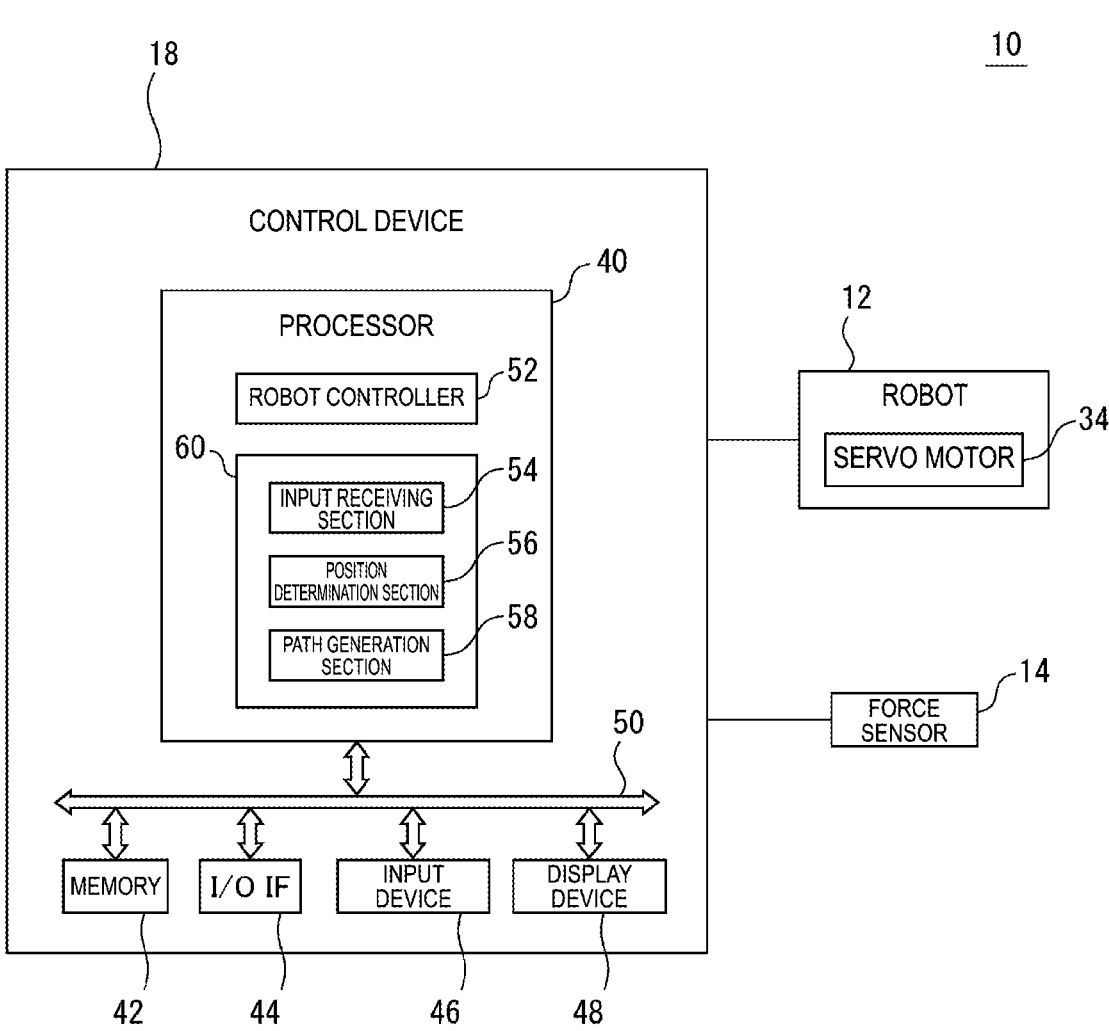
FIG. 21 is a block diagram illustrating other functions of a control device 18 in the robot system illustrated in FIG. 2.

Next, other functions of the control device 18 will be described with reference to FIG. 21. In the present embodiment, the processor 40 automatically generates the movement path MP of the robot 12 when forming the recess R. Specifically, the operator inputs, by operating the input device 46 of the control device 18, the machining condition MC for causing the robot 12 to execute the scraping process.

The machining condition MC includes dimensional information DI of the recesses R, trajectory control information TI of the scraper 16 moved by the robot 12, and a command CM for causing the robot 12 to execute the scraping process. The dimensional information DI includes, for example, a length x2 (i.e., distance x2 from the position P1 to the position P2), a width y1, and a depth z3 as illustrated in FIGS. 9 and 10.

The trajectory control information TI specifies, in the scraping process, the angle $\theta2$ (FIG. 7) at which the robot 12 moves and contacts the scraper 16 with the surface Q, and the angle $\theta3$ at which the scraper 16 separates away from the surface Q. Specifically, the trajectory control information TI includes the distances x1, z1, x3 and z2 illustrated in FIG. 7. The distances x1 and z1 specify the angle $\theta2$ as illustrated in equation (2) above, and the distances x3 and z2 specify the angle $\theta3$ as illustrated in equation (3) above.

In addition, the command CM to the robot 12 includes, for example, the above-described position control command $PC_n$ (speed command $PC_{V\_n}$, or the like) and the force control command FC (speed command $FC_V$, or the like). The processor 40, functioning as the input receiving section 54, receives the input of the machining condition MC (dimensional information DI, trajectory control information TI, command CM) through the input device 46.

The processor 40 then automatically generates, based on the machining condition MC received by the input from the operator and the position of the reference point RP (P1, P2 or P3) of one recess R determined by functioning as position determination section 56, the movement path MP of the robot 12 when forming the one recess R. For example, when determining the coordinate (X1, Y1, Z1) of the position P1 of a recess R as position determination section 56, the processor 40 acquires the coordinate (X1+x2, Y1, Z1) of the position P2 (FIG. 7) in the robot coordinate system C1 from the determined coordinate (X1, Y1, Z1) and the length x2, of the recess R, included in the dimensional information DI as the machining condition MC.

Then, the processor 40 acquires the coordinate (X1−x1, Y1, Z1+z1) of the teaching point $TP_1$ in the robot coordinate system C1 from the coordinate of the position P1 and the distances x1 and z1 included in the trajectory control information TI as the machining condition MC. The processor 40 also acquires the coordinate (X1+x2+x3, Y1, Z1+z2) of the teaching point $TP_3$ in the robot coordinate system C1 from the coordinate of the position P2 and the distances x3 and z2 included in the trajectory control information TI. The processor 40 also acquires the coordinate of the teaching point $TP_2$ as a coordinate (X1+x2, Y1, Z1+z1) spaced upward by the distance z1 from the position P2.

Thus, the processor 40 automatically calculates the teaching point $TP_n$ based on the determined position of the recess R, the dimensional information DI (length x2), and the trajectory control information TI (distance x1, z1, x3, z2), and as a result, automatically generates the movement path MP defined by the teaching points $TP_n$. Consequently, in the present embodiment, the processor 40 functions as a path generation section 58 (FIG. 21) that automatically generates the movement path MP.

The processor 40 calculates the teaching point $TP_n$ for each of the plurality of recesses R to be formed and generates the movement path MP. As described above, in the present embodiment, the device 60 includes the input receiving section 54, the position determination section 56, and the path generation section 58. The device 60 allows to eliminate the task of teaching the robot 12 about the teaching point $TP_n$ for each recess R, and automatically create a work program PG for executing the scraping process. Thus, the task involved in launching the robot system 10 can be significantly reduced.

Figure 22:
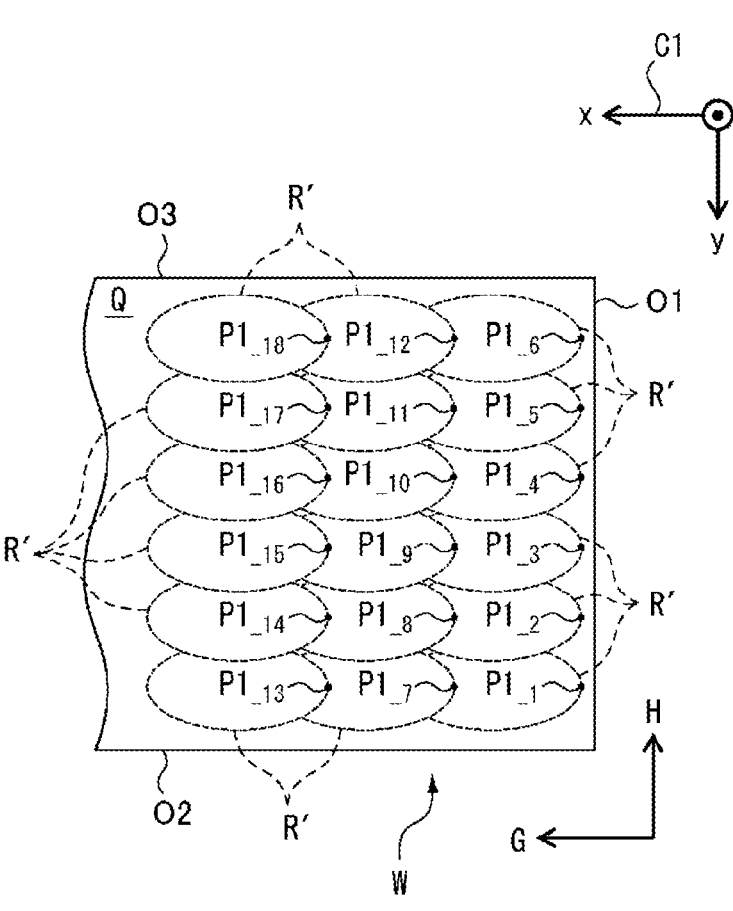
FIG. 22 illustrates an example of an order in determining the positions of recesses.

Note that the machining condition MC may further include information for specifying an order OR in which a plurality of recesses R are formed. In this case, the processor 40 may function as the position determination section 56 to determine, one by one, the positions of the respective reference points RP of the plurality of recesses R according to the order OR. FIG. 22 illustrates an example of the order OR.

According to an example illustrated in FIG. 22, the processor 40 determines a position P1 by the order OR of the positions $P1_{-1}$, $P1_{-2}$, $P1_{-3}$, . . . $P1_{-18}$, . . . . The processor 40 then machines the plurality of recesses R according to this order OR. Note that the machining condition MC may include information for specifying the order OR1 for determining the position of the recess R and the order OR2 for forming the recess R whose position has been determined.

Next, a method of executing a scraping process in the robot system 10 illustrated in FIG. 21 will be described. The processor 40 operates the robot 12 according to the work program PG stored in the memory 42. Specifically, the work program PG includes a position control program PG1 for positioning the robot 12 to the teaching point $TP_n$ and a teaching point calculation program PG2 for calculating the teaching point $TP_n$ based on the dimensional information DI and the trajectory control information TI. An example of the position control program PG1 is illustrated schematically in Table 1 below.

TABLE 1

| 1 MOVE [TP1] |
| 2 MOVE [TP2] |
| 3 MOVE [TP3] |

"MOVE[TP1]" in the position control program PG1 is a statement for positioning the scraper 16 (or TCP) to the teaching point $TP_1$. The processor 40 generates the position control command $PC_n$ described above according to the position control program PG1. On the other hand, the teaching point calculation program PG2, as described above, is a computer program for causing the processor 40 to automatically calculate the teaching point $TP_n$ from the position data of the reference point RP (coordinate of the position P1), the dimensional information DI (length x2) and the trajectory control information TI (distances x1, z1, x3, z2).

Figure 23:
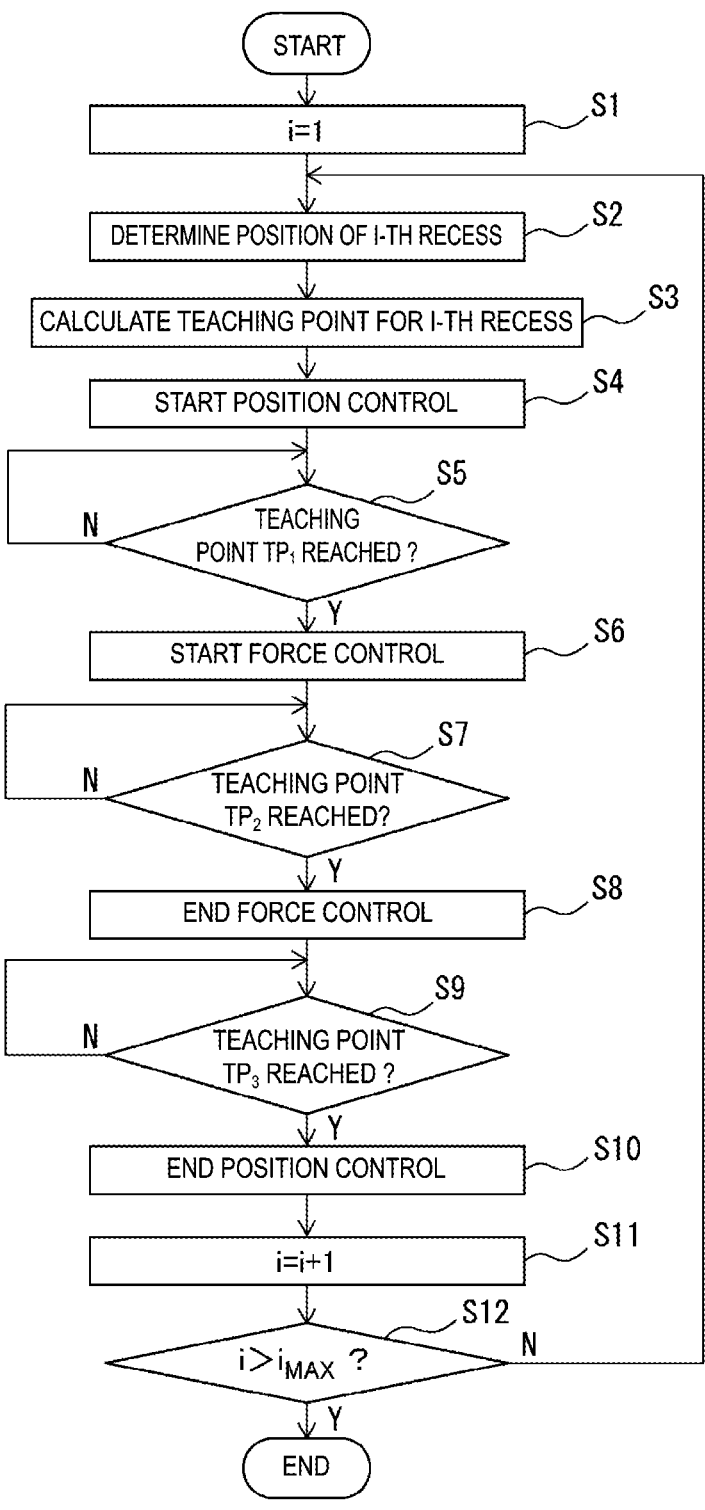
FIG. 23 is a flowchart illustrating an example of an operation flow of the robot system illustrated in FIG. 21.

Next, referring to FIG. 23, an example of the operation flow of the scraping process executed by the robot system 10 will be described. The flow illustrated in FIG. 23 is started when the processor 40 receives the scraping process start command from the operator, a host controller or the computer program (e.g., work program PG), after receiving the input of the shape information SI, the pattern information PI (design information PI1, pitch information PI2, angle information PI3, offset information PI4) and the machining condition MC (dimensional information DI, trajectory control information TI, command CM, order OR).

In step S1, the processor 40 sets the number "i" identifying the position $P1_{-i}$ of the recess R to be determined to "1". In step S2, the processor 40 determines position of position $P1_{-i}$ of the i-th recess R. For example, when i=1 is set at the start of this step S2, the processor 40 determines position of the position $P1_{-1}$ (FIG. 22) of the first recess R according to the order OR specified in the machining condition MC by the method described above.

In step S3, the processor 40, functioning as the path generation section 58, calculates the teaching point $TP_n$ for the recess R having the i-th position $P1_{-i}$. Specifically, the processor 40 reads the teaching point calculation program PG2 and automatically calculates the teaching point $TP_n$ (n=1, 2, 3) for forming the recess R having the i-th position $P1_{-i}$ by applying the coordinate of the position $P1_{-i}$ determined in the most recent step S2 and the dimensional information DI (length x2) and the trajectory control information TI (distances x1, z1, x3, z2) to the teaching point calculation program PG2. Thus, the movement path MP (FIG. 5) for forming the recess R having the i-th position $P1_{-i}$ is automatically generated.

In step S4, the processor 40 starts position control of the robot 12. Specifically, the processor 40 sequentially reads the statements specified in the position control program PG1 indicated in Table 1 above and generates a position control command $PC_n$ to move the scraper 16 to the teaching point $TP_n$, specified in the statement.

At this time, the processor 40 respectively applies the coordinate in the robot coordinate system C1 of the teaching points $TP_1$, $TP_2$, and $TP_3$ calculated in the most recent step S3 to [TP1], [TP2], and [TP3] in the position control program PG1. Thus, the processor 40 operates the robot 12 according to the position control program PG1 and starts position control to position the scraper 16 in the order of teaching points $TP_1 \rightarrow TP_2 \rightarrow TP_3$ calculated in the most recent step S3.

In step S5, the processor 40 determines whether the scraper 16 has reached the teaching point $TP_1$. For example, the processor 40 can acquire the position of the scraper 16 in the robot coordinate system C1 based on a feedback FB from the rotation detector (encoder, Hall element, or the like) provided in each servo motor 34 of the robot 12, and from the acquired position, the processor 40 can determine whether the scraper 16 has reached the teaching point $TP_1$. When determining that the scraper 16 has reached the teaching point $TP_1$ (i.e., YES), the processor 40 proceeds to step S6, while when determining that the scraper 16 has not reached the teaching point $TP_1$ (i.e., NO), loops step S5.

In step S6, the processor 40 starts the force control described above. As a result, the scraper 16 moves toward the surface Q in the trajectory TR inclined to form an angle θ2 with respect to the surface Q and contacts the surface Q at the position P1, as illustrated in FIG. 7. In step S7, the processor 40 determines, based on the feedback FB, whether the scraper 16 (or wrist flange 28b) has reached the position corresponding to the teaching point $TP_2$. When determining YES, the processor 40 proceeds to step S8, while when determining NO, loops step S7.

In step S8, the processor 40 terminates force control. As a result, the scraper 16 moves toward the upper right in the trajectory TR inclined to form an angle θ3 with respect to the surface Q of the workpiece W, and the tip 32a of the scraper 16 separates away from the surface Q at the position P2. In step S9, the processor 40 determines, based on the feedback FB, whether the scraper 16 has reached the teaching point $TP_3$. When determining YES, the processor 40 proceeds to step S10, while when determining NO, loops step S9.

In step S10, the processor 40 terminates position control. In step S11, the processor 40 increments the number "i" identifying the position $P1_{-i}$ of the i-th recess R by "1" (i=i+1). In step S12, the processor 40 determines whether the number "i" identifying the position $P1_{-i}$ of the i-th recess R becomes $i > i_{MAX}$.

This maximum value $i_{MAX}$ specifies the number of the recesses R (i.e., the number of times to execute scraping process) to be formed on the surface Q and can be included in the information of the order OR as the machining condition MC. When determining $i > i_{MAX}$ (i.e., YES), the processor 40 stops the operation of the robot 12 and terminates the flow illustrated in FIG. 23, while when determining $i \leq i_{MAX}$ (i.e., NO), returns to step S2.

Thus, the processor 40 repeatedly executes the loop of steps S2 to S12 until determining YES in step S12, determines the position $P1_{-i}$ of the recess R in order according to the order OR, for example, as illustrated in FIG. 22, and controls the operation of the robot 12 based on the determined position $P1_{-i}$ of the recess R to form the plurality of recesses R in order on the surface Q. Note that the order OR can be arbitrarily determined by the operator, not limited to the example illustrated in FIG. 22.

As described above, in the present embodiment, the processor 40 can automatically determine the position of the recess R and automatically generate the work program PG by automatically calculating the teaching point $TP_n$. Thus, the task of creating the work program PG can be greatly simplified.

In the present embodiment, the processor 40 updates the position data of the teaching point $TP_n$ (i.e., the statements [TP1], [TP2], and [TP3]) specified in the position control program PG1 every time the scraping process is executed. According to this configuration, one register for storing the teaching point $TP_n$ is provided in the memory 42, and the teaching point $TP_n$ is sequentially updated in the one register. Thus, the teaching points $TP_n$ for all recesses R do not need to be stored in the memory 42, thereby saving the capacity of the memory 42 used.

Figure 24:
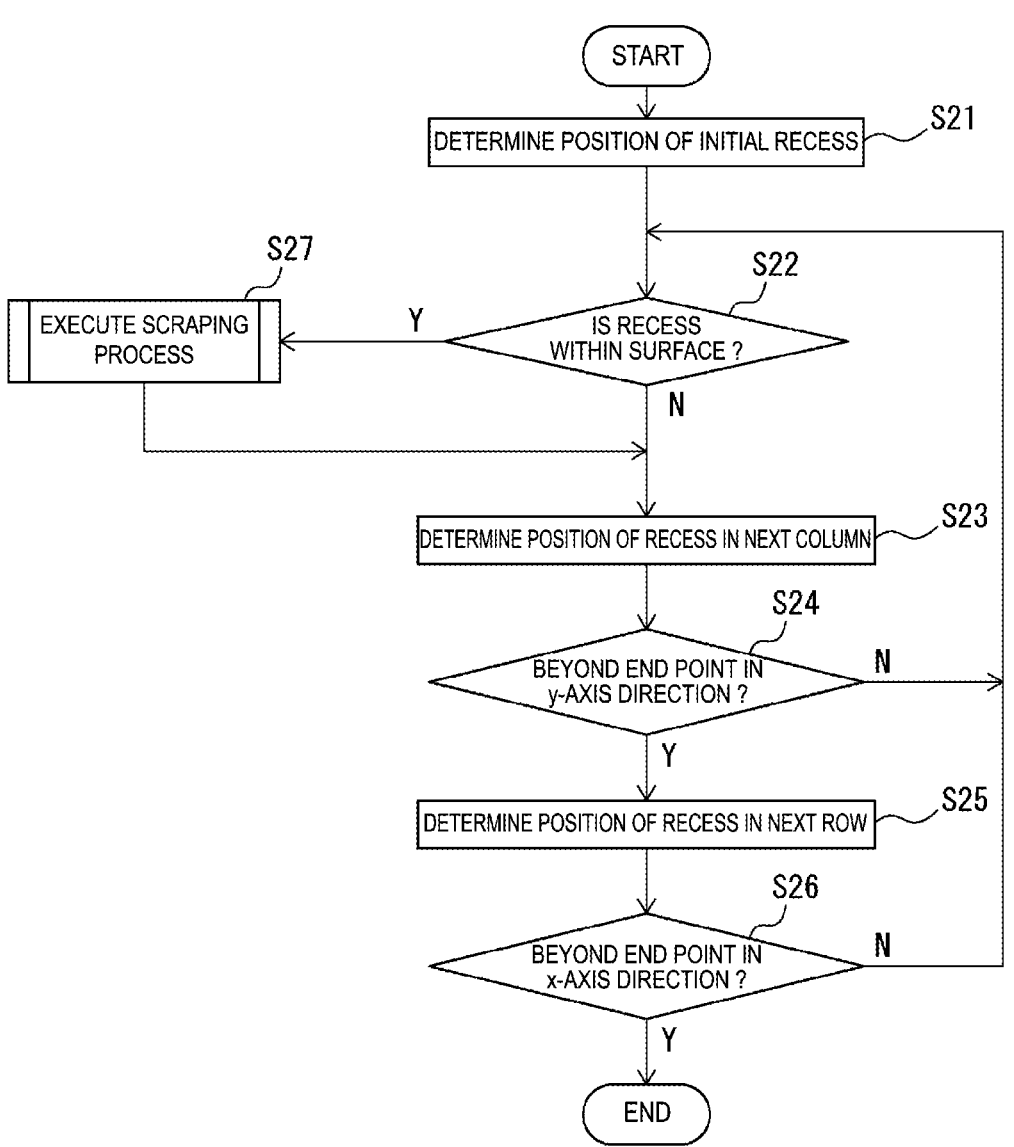
FIG. 24 is a flowchart illustrating another example of an operation flow of the robot system illustrated in FIG. 21.

Next, with reference to FIG. 24, another example of the operation flow of the scraping process executed by the robot system 10 in FIG. 21 will be described. The flow illustrated in FIG. 24 is started when the processor 40 receives the scraping process start command from the operator, a host controller or the computer program (e.g., work program PG), after receiving the input of the shape information SI, the pattern information PI (design information PI1, pitch information PI2, angle information PI3, offset information PI4) and the machining condition MC (dimensional information DI, trajectory control information TI, command CM, order OR).

Figure 26:
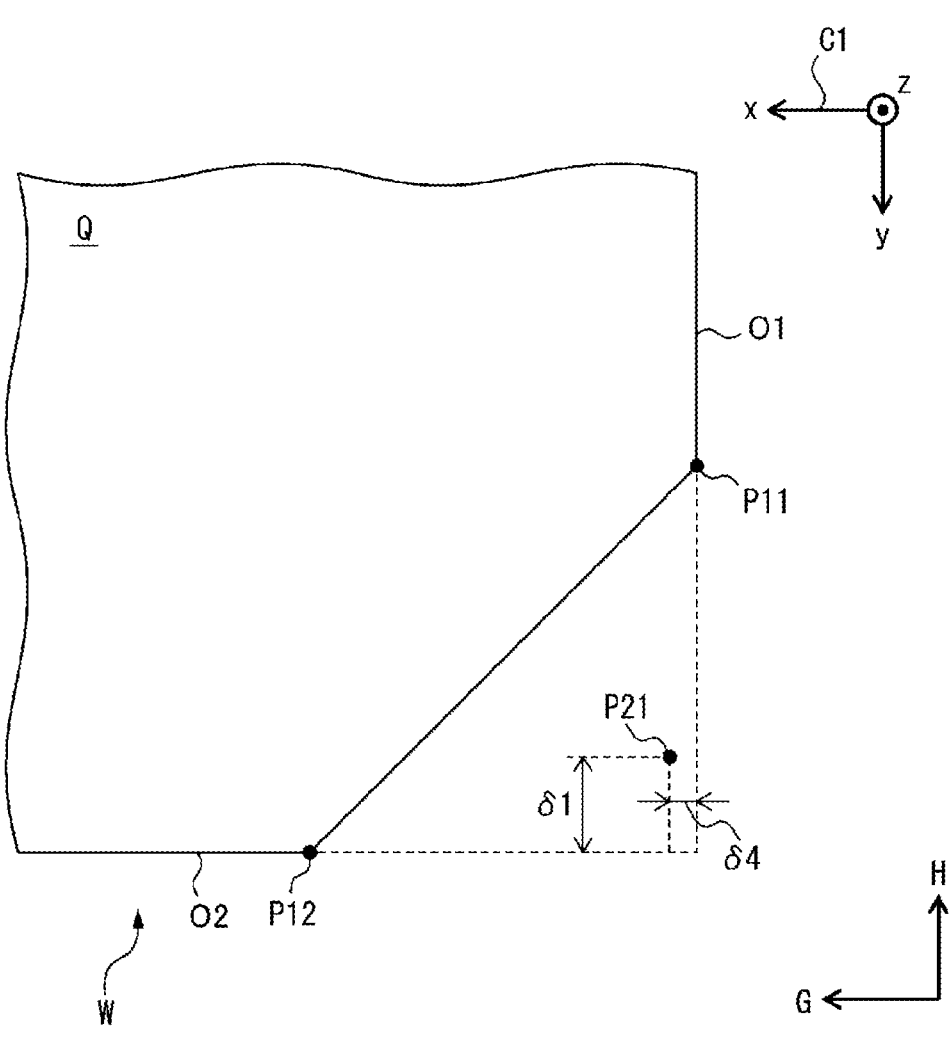
FIG. 26 is a diagram for explaining step S21 in FIG. 24.

In the present embodiment, it is assumed that the operator inputs the shape information SI of the octagonal surface Q illustrated in FIG. 13. In step S21, the processor 40 functions as the position determination section 56 to determine the position of the initial recess R. Specifically, the processor 40 first sets a start point P21 in the robot coordinate system C1 as illustrated in FIG. 26. Here, it is assumed that the x coordinate of the left edge point (in the present embodiment, apexes P11 and P18) of the surface Q is $X_\alpha$ and they coordinate of the front edge point (in the present embodiment, apexes P12 and P13) is $Y_\alpha$.

In this case, the processor 40 defines the coordinate $(X_{21}, Y_{21})$ of the start point P21 in the x-y plane of the robot coordinate system C1 by using the offset distance δ specified in the offset information PI4, as $(X_{21}, Y_{21})=(X_\alpha+\delta4, Y_{60}-\delta1)$. Thus, the start point P21 is set at a position displaced by the offset distance δ4 rightward from the apex P11 and displaced by the offset distance δ1 backward from the apex P12.

Figure 27:
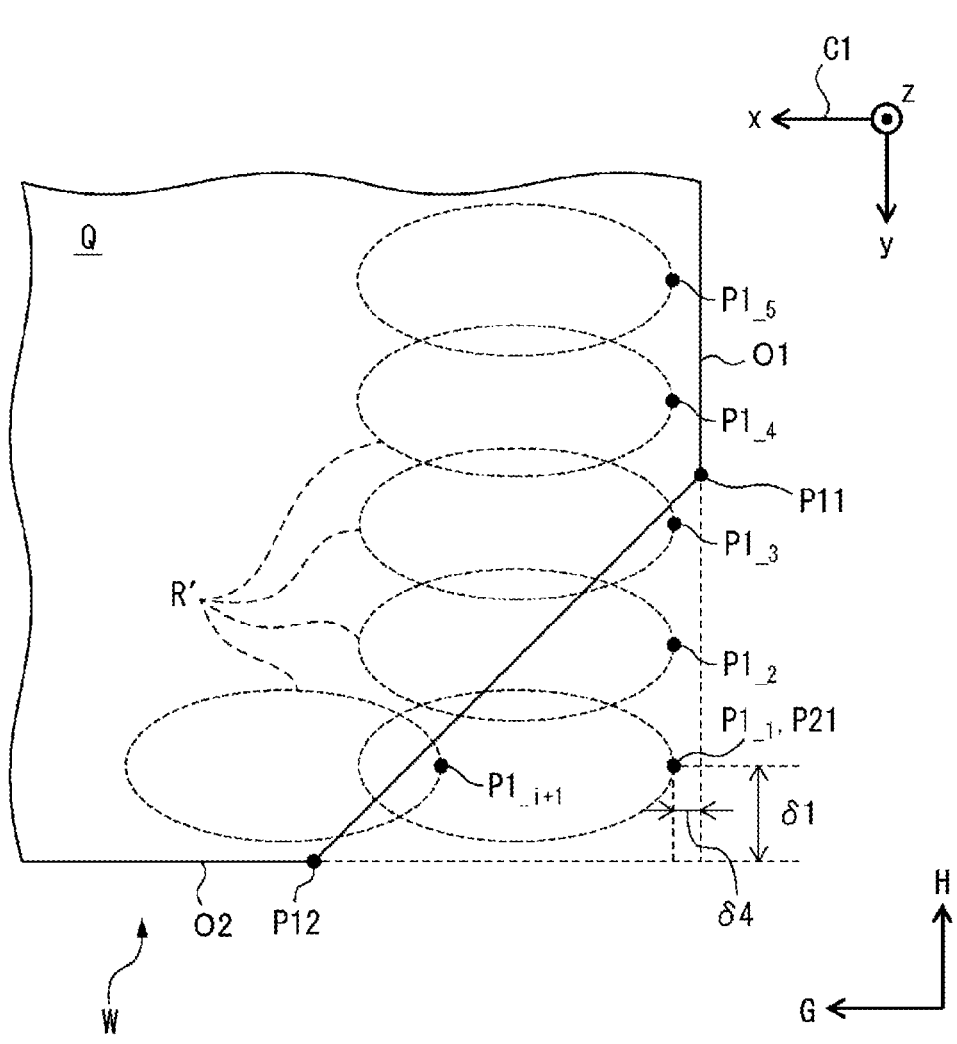
FIG. 27 is a diagram for explaining a method of determining positions of recesses in the flow illustrated in FIG. 24.

The processor 40 then determines the position of the reference point RP of the initial recess R as the start point P21. For example, when the position P1 of the recess R is used as the reference point RP, the processor 40 determines the coordinate $(X1_{-1}, Y_{-1})$ of the position $P1_{-1}$ of the initial recess R as $(X1_{-1}, Y_{-1})=(X_{21}, Y_{21})=(X_\alpha+\delta4, Y_\alpha-\delta1)$. As a result, the initial position $P1_{-1}$ is determined as the start point P21 as illustrated in FIG. 27. The processor 40 stores the coordinate $(X1_{-1}, Y1_{-1})$ of the determined position $P1_{-1}$ in the memory 42.

In step S22, the processor 40 determines whether the entire area of the virtual occupied region R' corresponding to the most recently determined position $P1_{-i}$ is within the region of the surface Q. Here, the virtual occupied region R' can be estimated from the length x2 and width y1 of the recess R included in the dimensional information DI.

Thus, the processor 40 can acquire the position (coordinate) in the robot coordinate system C1 of the virtual occupied region R' corresponding to the position $P1_{-i}$, from the dimensional information DI (Length x2, width y1) and the coordinate of the determined position $P1_{-i}$. The processor 40 can then determine, from the position of the virtual occupied region R' acquired and the shape information SI of the surface Q, whether at least a part of the virtual occupied region R' protrudes outward from the end edge of the surface Q.

When determining that the entire area of the virtual occupied region R' is within the region of the surface Q (i.e., YES), the processor 40 proceeds to step S27, while when determining that at least a part of the virtual occupied region R' protrudes outside the region of the surface Q (i.e., NO), cancels the position $P1_{-i}$ of the recess R determined most recently (e.g., erase from the memory 42) and proceeds to step S23.

In step S23, the processor 40 determines the position of the recess R in the next column. For example, when the processor 40 has executed step S21 just before this step S23, the processor 40 determines the position $P1_{-2}$ of the next recess R to be in the position which is shifted in the column direction H by the pitch $PT_H$ specified in the pitch information PI2 from the position $P1_{-1}$ determined in the just before step S21.

That is, the processor 40 determines the coordinate $(X1_{-2}, Y1_{-2})$ of the position $P1_{-2}$ of the next recess R, as $(X1_{-2}, Y1_{-2})=(X1_{-1}, Y1_{-1}-PT_H)=(X_\alpha+\delta4, Y_\alpha-\delta1-PT_H)$. As a result, as illustrated in FIG. 27, the position $P1_{-2}$, of the second recess R is determined to a position that is displaced backward from the first position $P1_{-1}$, by the distance $PT1_H$.

The processor 40 determines the coordinate $(X1_{-i}, Y1_{-i})$ of the position $P1_{-i}$ of the i-th recess R, as $(X1_{-i}, Y1_{-i})=(X1_{-i-1}, Y1_{-i-1}-PT_H)$ by using the coordinate $(X1_{-i-1}, Y1_{-i-1})$ of the position $P1_{-i-1}$ of the i−1-th recess R and the pitch $PT_H$, by repeatedly executing step S23 until determining YES in step S24 described later.

Figure 28:
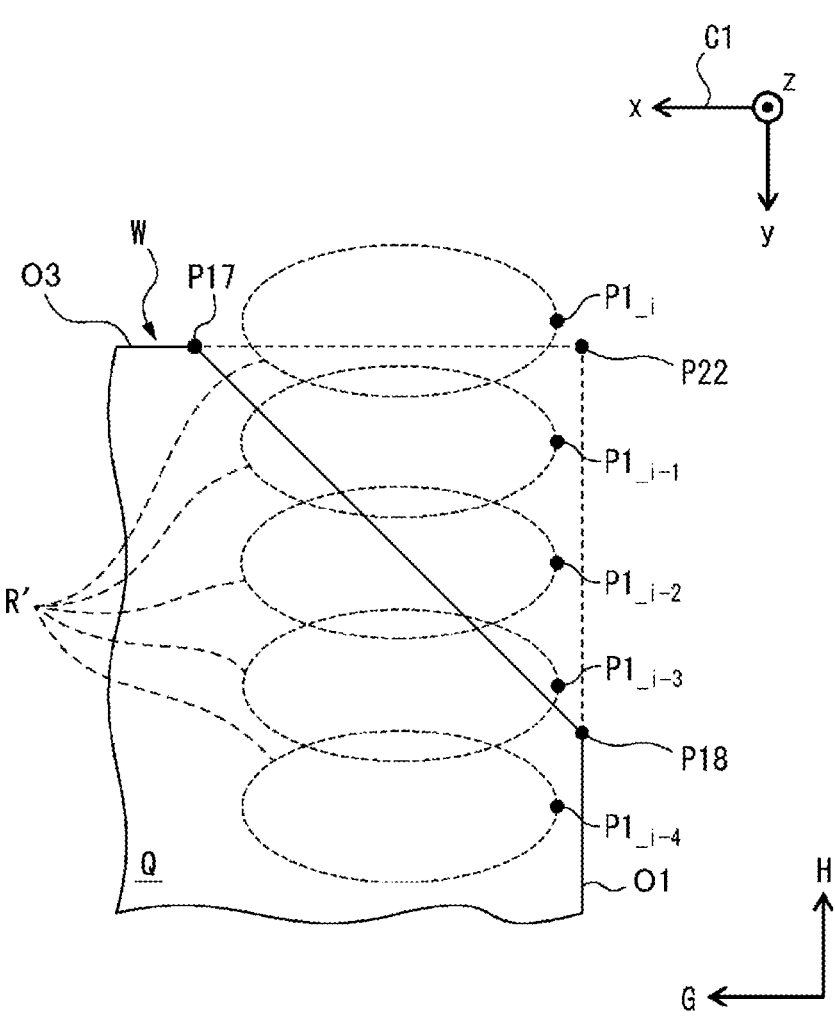
FIG. 28 is a diagram for explaining a method of determining positions of recesses in the flow illustrated in FIG. 24.

Thus, as illustrated in FIGS. 27 and 28, the first position $P1_{-1}$, the second position $P1_{-2}$, the third position $P1_{-3}$, - - - , the i−1-th position $P1_{-i-1}$ and the i-th position $P1_{-i}$ are determined in order. The processor 40 stores the coordinate $(X1_{-i}, Y1_{-i})$ of the position $P1_{-i}$ determined in step S23 in the memory 42.

In step S24, it is determined whether the i-th position $P1_{-i}$ determined in the most recent step S23 exceeds the end point P22 in the y-axis direction. Here, it is assumed that the y coordinate of the rear edge point (in the present embodiment, apexes P16 and P17) of the surface Q is $Y_\beta$. In this case, the end point P22 is defined as the point of the coordinate $(X, Y_\beta)$ (in other words, a point on a virtual line passing through the apexes P16 and P17).

In this step S24, the processor 40 determines that when the y coordinate $Y1_{-i}$ of the most recently determined position $P1_{-i}$ satisfies $Y1_{-i} \leq Y_\beta$, the position $P1_{-i}$ has exceeded the end point P22 (i.e., YES). The processor 40 then cancels (e.g., erase from the memory 42) the most recently determined position $P1_{-i}$ and proceeds to step S25.

On the other hand, when $Y1_{-i}>Y_\beta$ is satisfied, the processor 40 determines NO and returns to step S22. For example, in the case of the example illustrated in FIG. 28, since position $P1_{-i}$ is behind the end point P22 $(Y1_{-i}<Y_\beta)$, the processor 40 will cancel the position $P1_{-i}$ and proceeds to step S25.

In step S25, the processor 40 determines the position of a recess R in the next row. For example, it is assumed that in the most recent step S23, the position $P1_{-i}$ of the rear end of the first row illustrated in FIG. 28 is determined. In this case, the processor 40 determines the position $P1_{-i+1}$ of the recess R in the second row to a position, which is the position shifted in the row direction G from the position $P1_{-1}$ at the front end of the first row by the pitch $PT_G$ specified in the pitch information PI2, as illustrated in FIG. 27.

That is, the processor 40 determines the coordinate $(X1_{\_i+1}, Y1_{\_i+1})$ of the position $P1_{\_i+1}$ of the recess R in the second row as $(X1_{\_i+1}, Y1_{\_i+1})=(X1_{\_1}+PT_G, Y1_{\_1})$. As a result, as illustrated in FIG. 27, the position $P1_{\_i+1}$ of the i+1-th recess R is determined to a position displaced by the distance $PT_G$ rightward of the first position $P1_{\_1}$. The processor 40 stores the position $P1_{\_i+1}$ determined in step S25 in the memory 42.

Figure 29:
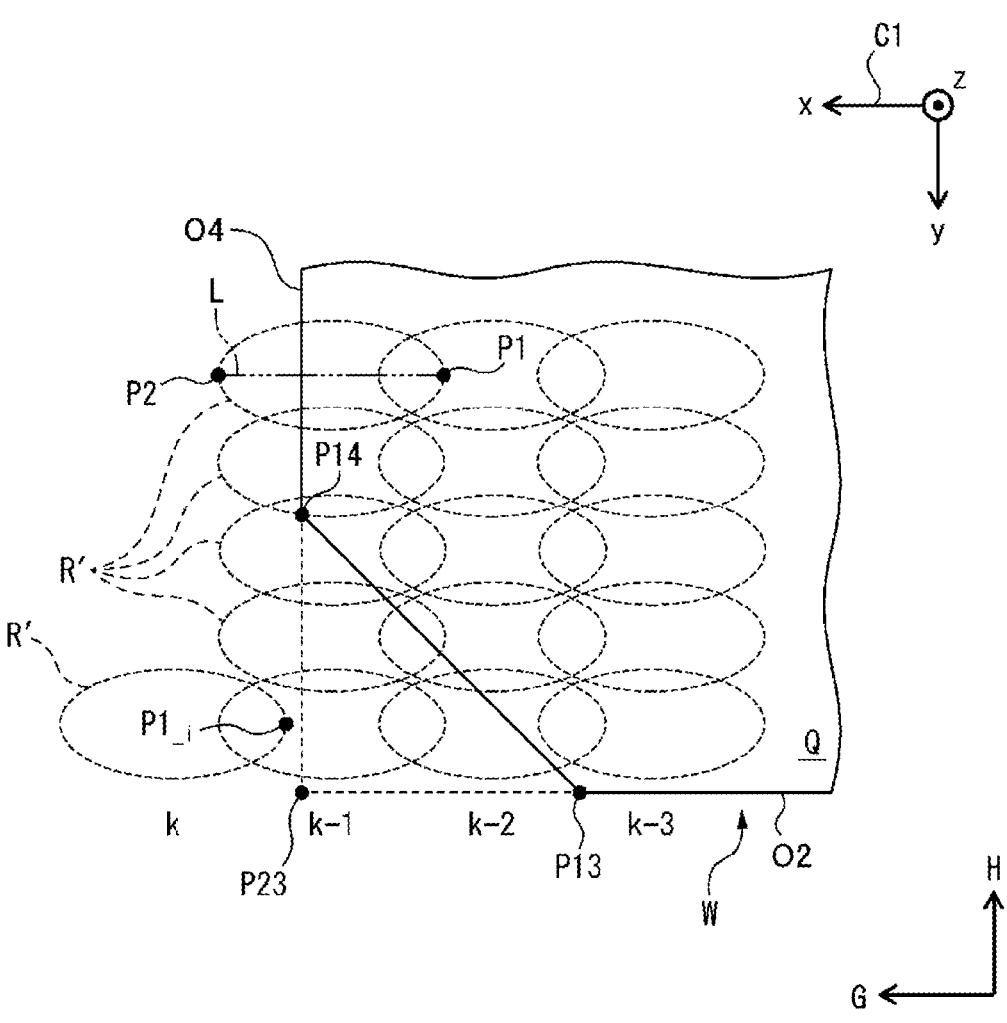
FIG. 29 is a diagram for explaining a method of determining positions of recesses in the flow illustrated in FIG. 24.

In step S26, the processor 40 determines whether the i-th position $P1_{\_i}$ determined in the most recent step S25 has exceeded the end point P23 in the x-axis direction. An example of the end point P23 is illustrated in FIG. 29. Here, it is assumed that the x coordinate of the right edge point (in the present embodiment, apexes P14 and P15) of the surface Q is $X_\beta$. In this case, the end point P23 is defined as a point of the coordinate $(X_\beta, Y)$ (in other words, a point on a virtual line passing through the apexes P14 and P15.).

In this step S26, the processor 40 determines that when the x coordinate $X1_{\_i}$ of the most recently determined position $P1_{\_i}$ satisfies $X1_{\_i} \geq X_\beta$, the position $P1_{\_i}$ has exceeded the end point P23 (i.e., YES). The processor 40 then cancels (e.g., erase from the memory 42) the most recently determined position $P1_{\_i}$ and terminates the flow illustrated in FIG. 24.

On the other hand, when $X1_{\_i} < X_\beta$ is satisfied, the processor 40 determines NO and proceeds to step S22. For example, in the case of the example illustrated in FIG. 29, since the position $P1_{\_i}$ is located rightward $(X1_{\_i} > X_\beta)$ of the end point P23, the processor 40 cancels the position $P1_{\_i}$ and end the flow illustrated in FIG. 24.

Figure 25:
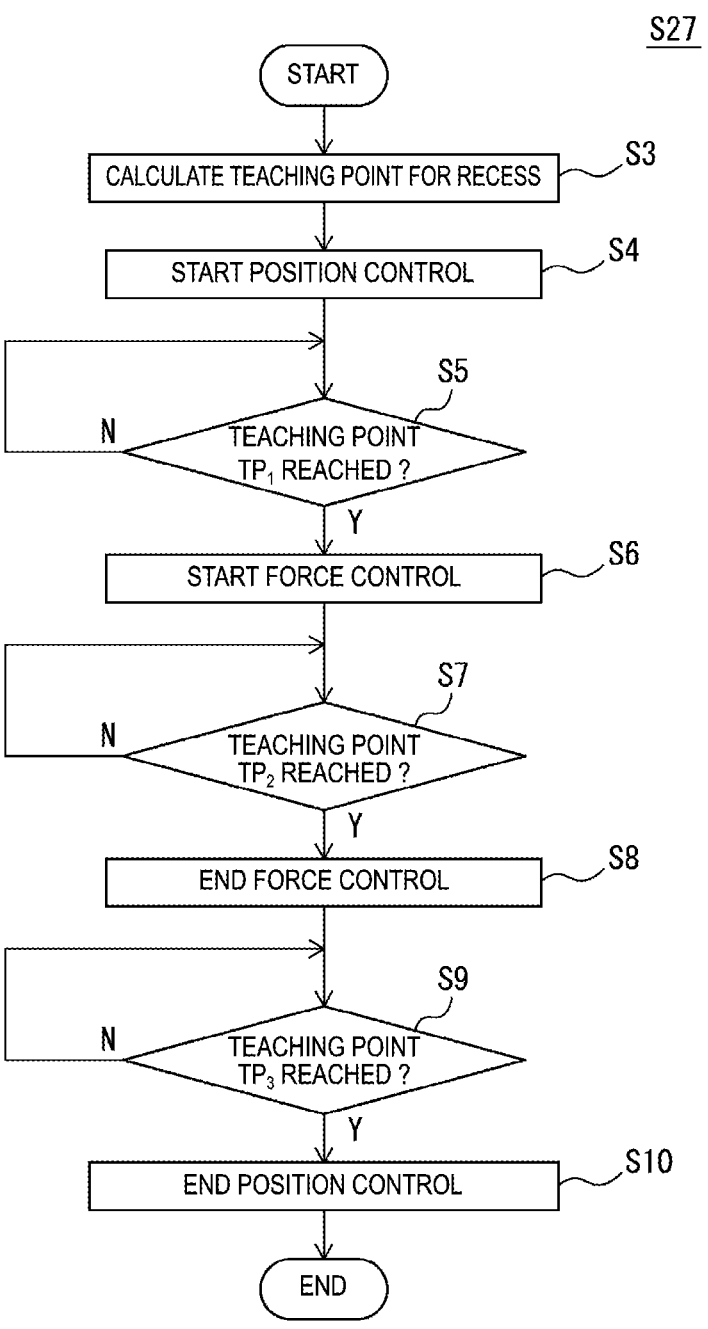
FIG. 25 illustrates an example of a flow of step S27 in FIG. 24.

When determining YES in step S22, the processor 40 executes in step S27 the scraping process based on the most recently determined position $P1_{\_i}$. This step S27 is illustrated in FIG. 25. In the flow illustrated in FIG. 25, the processes similar to those in FIG. 23 are assigned the same step numbers, and the overlapping descriptions are omitted.

After the start of step S27, the processor 40, in step S3, calculates the teaching point $TP_n$ based on the machining condition MC for which the input has been received, and the most recently determined position $P1_{\_i}$, and executes steps S4 to S10 based on the teaching point $TP_n$ to form, by the scraping process, the recess R extending from the position $P1_{\_i}$ to the position $P2_{\_i}$ by the distance x2.

Figure 30:
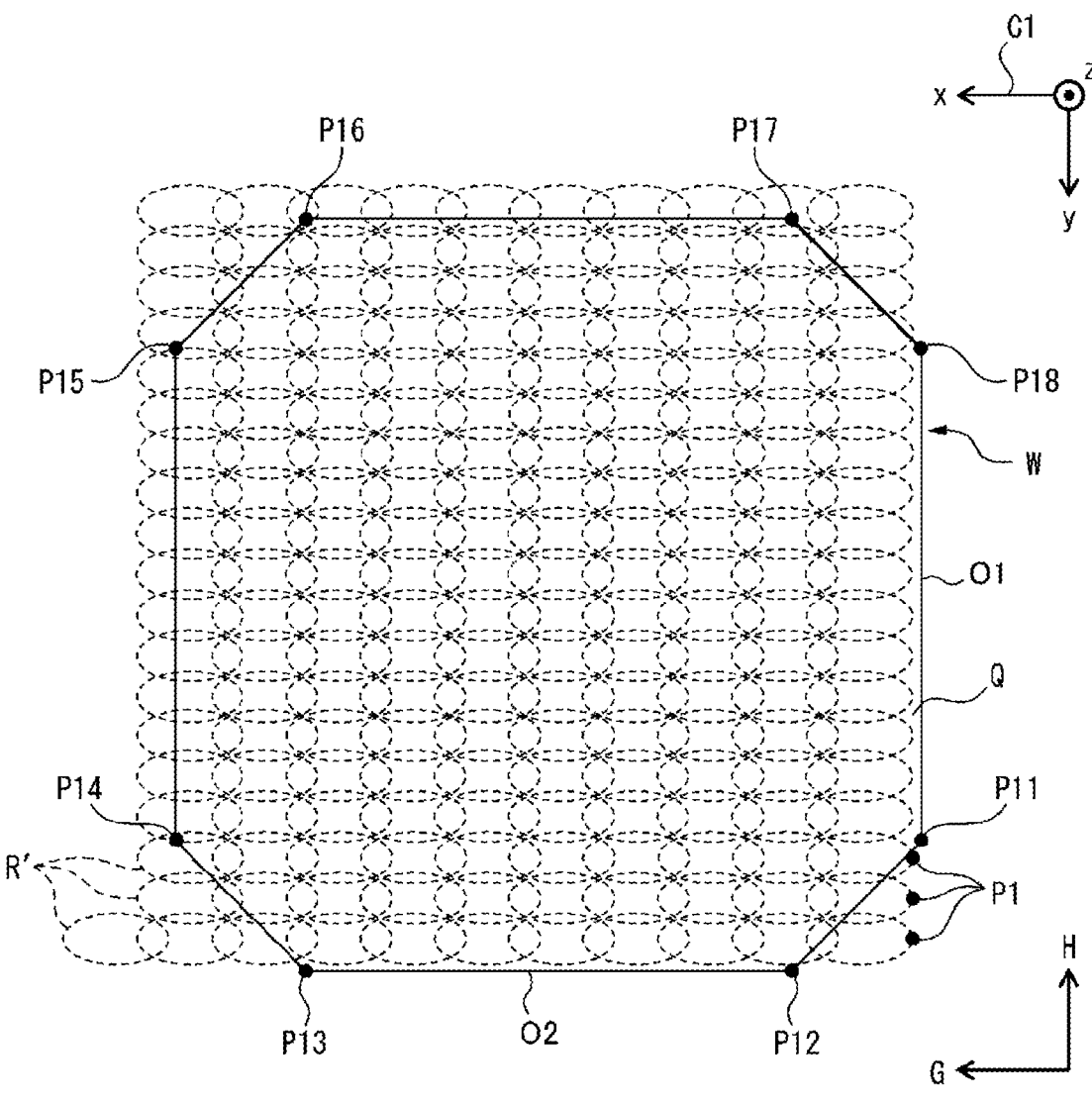
FIG. 30 illustrates all positions of recesses determined by the flow illustrated in FIG. 24.
Figure 31:
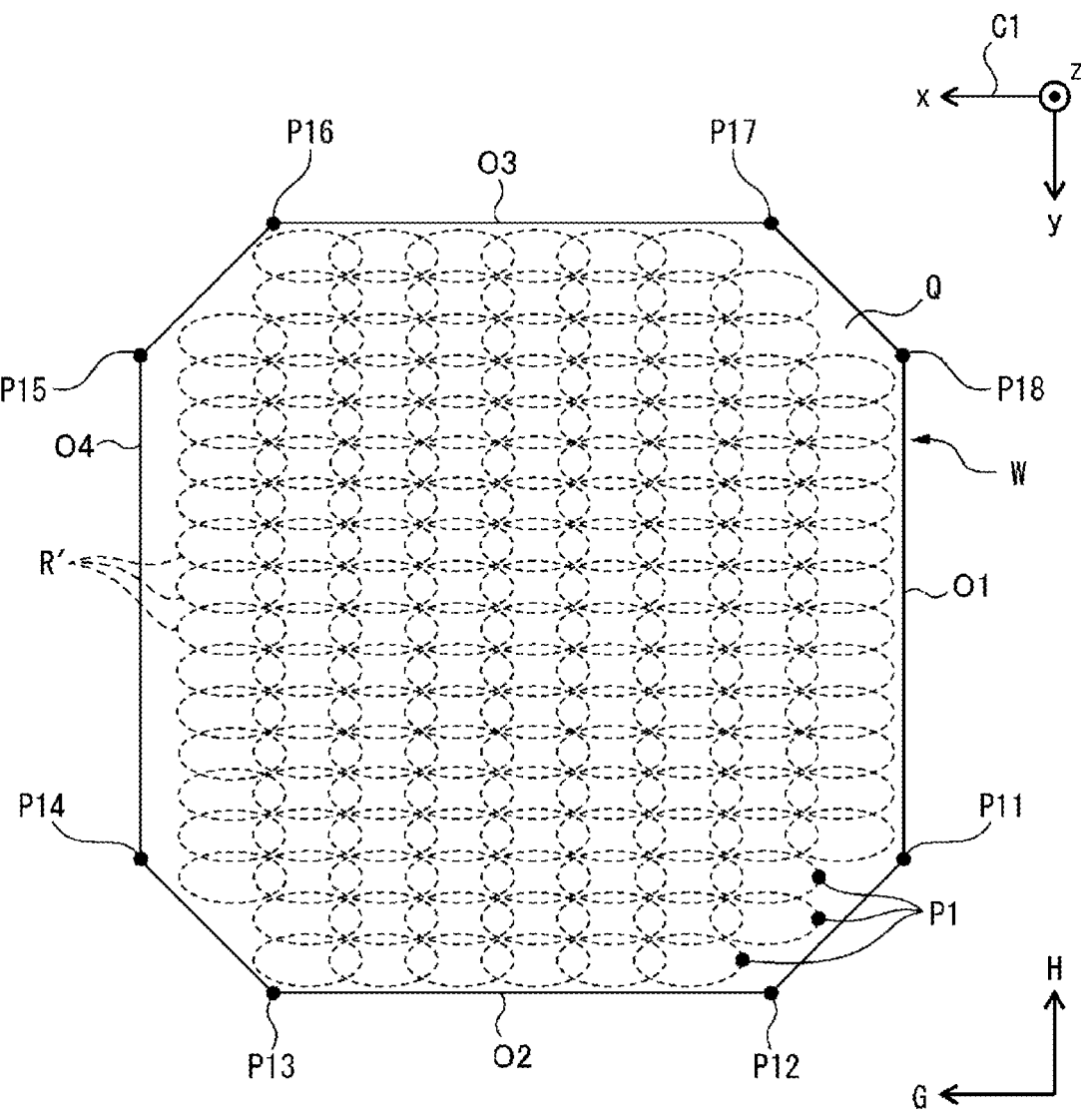
FIG. 31 illustrates the positions of recesses that are not cancelled among the positions of the recesses determined by the flow illustrated in FIG. 24.

As described above, the processor 40 determines the position $P1_{\_i}$ corresponding to the virtual region R' illustrated in FIG. 30 by executing steps S21, S23 and S25, cancels the positions $P1_{\_i}$ determined as NO in step S22 among the determined positions $P1_{\_i}$, and as a result, executes step S27 for the positions $P1_{\_i}$ corresponding to the virtual region R' illustrated in FIG. 31.

In the present embodiment, since the start point P21 (FIG. 27) described above is respectively arranged to be displaced by offset distance δ4 and M from the apexes P11 and P12, the positions of the recesses R are determined such that the position $P1_{\_i}$ of the recess R in the first row is displaced rightward from the end edge O1 by the offset distance δ4 and the position $P1_{\_1}$ of the recesses R in the first column is displaced backward from the end edge O2 by the offset distance δ1. The present embodiment enables the processor 40 to automatically determine the position of the recess R and automatically calculate the teaching point $TP_n$, thereby automatically creating the work program PG.

It will be recognized that the flow illustrated in FIG. 24 allows the positions of the recesses R in a staggered design as illustrated in FIG. 15 to be determined. Alternatively, in the flow illustrated in FIG. 24, the processor 40 may determine the position P1 of the recess R in the next row in step S23, and the position $P1_{\_i}$ of the recess R in the next column in step S25. In this case, the processor 40 will determine the positions $P1_{\_i}$ of the recesses R in order in the row direction G, and when the determined position $P1_{\_i}$ exceeds the end point P23, the processor 40 will determine the position $P1_{\_i}$ of the recess R in the first row of the next column.

In the flow illustrated in FIG. 23 or 25, the processor 40 may omit step S8 and terminate the position control and the force control in step S10. That is, in this case, the processor 40 executes the position control and the force control in parallel until determining YES in step S9.

Note that the pattern information PI may further include a position cancel condition CC for defining whether to cancel the determined position when a part of the virtual occupied region R' of the recess R whose position has been determined by the processor 40 protrudes outward from the end edge O of the surface Q. This position cancel condition CC will be described with reference to FIG. 32. In the example illustrated in FIG. 32, when the processor 40 determines the sixth position $P1_{\_6}$, some region J of the virtual occupied region R' corresponding to the position $P1_{\_6}$ protrudes backward from the rear end edge O3 of the workpiece W.

As in step S22 above, the processor 40 can acquire the position (coordinate) in the robot coordinate system C1 of the virtual occupied region R' corresponding to the position $P1_{\_6}$ from the dimensional information DI (length x2, width y1) and the coordinate of the determined position $P1_{\_6}$, and determine, from the position in the virtual occupied region R' and the shape information SI of the surface Q, whether a part of the virtual occupied region R' corresponding to the position $P1_{\_6}$ protrudes outward from the end edge O1, O2, O3 or O4 of the surface Q.

The position cancel condition CC determines whether to cancel the determined position $P1_{\_i}$ when a part of the virtual occupied region R' corresponding to the determined position $P1_{\_i}$ protrudes outward from the end edge O1, O2, O3 or O4 of the surface Q. For example, when a condition is set, as the position cancel condition CC, to cancel the position $P1_{\_i}$ in the case where the virtual occupied region R' protrudes from the end edge O1, O2, O3 or O4 of the surface Q, the processor 40 cancels the determined position $P1_{\_i}$ and determines the next position $P1_{\_i+1}$ as with a case where it is determined NO in the step S22 described above. That is, in the example illustrated in FIG. 32, the processor 40 cancels the sixth position $P1_{\_6}$. In this case, the processor 40 does not execute the scraping process to form the recess R having the sixth position $P1_{\_i}$.

On the other hand, when a condition is set, as the position cancel condition CC, that the position $P1_{\_i}$ is not canceled when the virtual occupied region R' protrudes from the end edge O1, O2, O3 or O4 of the surface Q, the processor 40 holds the position data of the determined position $P1_{\_i}$ in the memory 42 and executes the scraping process to form the recess R having the position $P1_{\_i}$.

Figure 32:
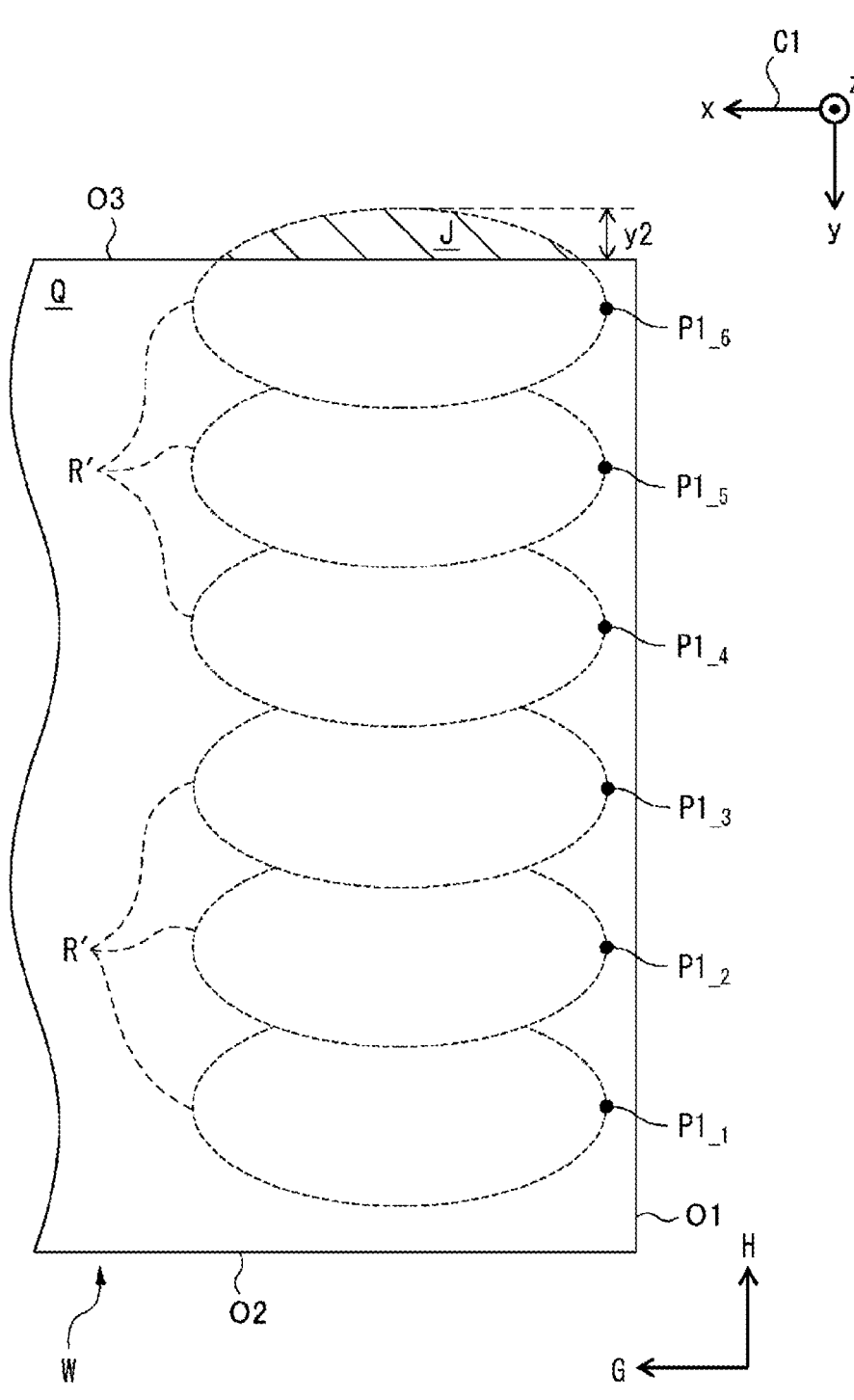
FIG. 32 is a diagram for explaining a position cancel condition, which illustrates a state where the virtual occupied region of a recess determined in position protrudes from the end edge of the surface of a workpiece.

Here, when the recess R having the position $P1_{\_6}$ in FIG. 32 is formed by the scraping process, the stress concentration occurs at the rear end edge O3 of the surface Q where the tip 32*a* of the scraper 16 contacts during the scraping process, and the depth z3 of the recess R may become excessive at the position of the rear end edge O3. In order to avoid such a situation, by determining the position cancel condition CC to cancel the position $P1_{\_6}$, the operator can avoid forming the recess R whose depth z3 becomes excessive at the rear end edge O3.

On the other hand, when a line L (i.e., the trajectory TR of the tip $32a$ while the tip $32a$ is in contact with the surface Q) connecting the position P1 and the position P2 of the recess R to be formed is substantially orthogonal to the end edge O1, O2, O3 or O4 of the surface Q, the stress concentration that occurs at the end edge O1, O2, O3 or O4 when the recess R is formed by the scraping process can be mitigated. For example, in the case of the example in FIG. 29, the line L connecting the position P1 and the position P2 is substantially orthogonal to the end edge O4 of the surface Q.

In such a case, the formation of this recess R may not cause the depth $z3$ to be excessive, and thus it may not be necessary to cancel the determined position $P1_{\_i}$. Consequently, the operator can allow the recess R to be formed by setting the position cancel condition CC to not cancel the determined position $P1_{\_i}$ when the line L is substantially orthogonal to the end edge O1, O2, O3 or O4.

In this case, when determining the position $P1_{\_i}$, the processor 40 determines whether the line L connecting the positions $P1_{\_i}$ and the position $P2_{\_i}$ is orthogonal to the end edge O1, O2, O3 or O4. The position cancel condition CC may be set as a condition that the position $P1_{\_i}$ of the determined recess R is canceled only when the line L connecting the position P1 and the position P2 is not orthogonal to the end edge O1, O2, O3 or O4.

Thus, the present embodiment enables the operator, by inputting the position cancel condition CC through the input device 46, to arbitrarily select whether to cancel the position $P1_{\_i}$ and not execute the scraping process, or to hold the position $P1_{\_1}$ and execute the scraping process when a part of the virtual occupied region R' corresponding to the position $P1_{\_i}$ determined by the position determination section 56 protrudes outward from the end edge O.

The position cancel condition CC may be set as a condition that the determined position $P1_{\_i}$ is canceled, when the protrusion amount PA by which the virtual occupied region R' corresponding to the determined position $P1_{\_i}$ protrudes outward from the end edge O of the workpiece W, exceeds a predetermined threshold value $PA_{th}$. For example, in the example illustrated in FIG. 32, the protrusion amount PA may be defined as a distance $y2$ by which the region J protrudes backward from the rear end edge O3.

Alternatively, the protrusion amount PA may be defined as the volume of the region J or the area of the region J in the x-y plane of the robot coordinate system C1. When determining the position $P1_{\_i}$, the processor 40 calculates the protrusion amount PA from the position of the virtual occupied region R' in the robot coordinate system C1 and the shape information SI of the surface Q, and determines whether the protrusion amount PA exceeds the threshold value $PA_{th}$ ($PA \geq PA_{th}$). According to the position cancel condition CC, the processor 40 cancels the determined position $P1_{\_i}$ only when the protrusion amount PA exceeds the threshold value $PA_{th}$.

The pattern information PI may further include at least one of machining region setting information MI, which sets a machining region ME where the scraping process is to be executed on the surface Q, and non-machining region setting information NI, which sets a non-machining region NE where the scraping process is not to be executed on the surface Q. The machining region ME and the non-machining region NE will be described below with reference to FIGS. 33 and 34.

Figure 33:
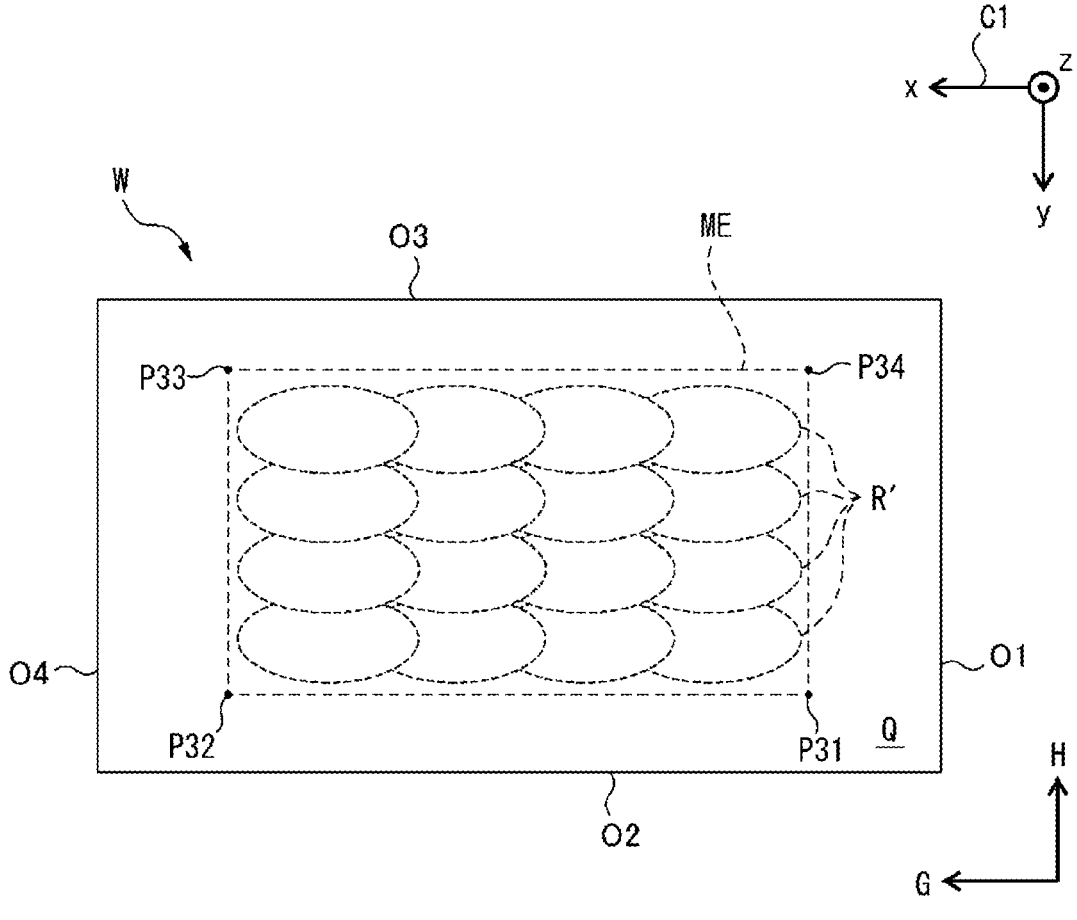
FIG. 33 illustrates a state in which a machining region is set on the surface of a workpiece.

In the example illustrated in FIG. 33, the machining region ME is set in the central region of the surface Q. This machining region ME is the region of the surface Q on which the scraping process should be executed to form the recess R. The machining region setting information MI includes information of the position (coordinate) in the robot coordinate system C1 that sets the machining region ME.

Figure 34:
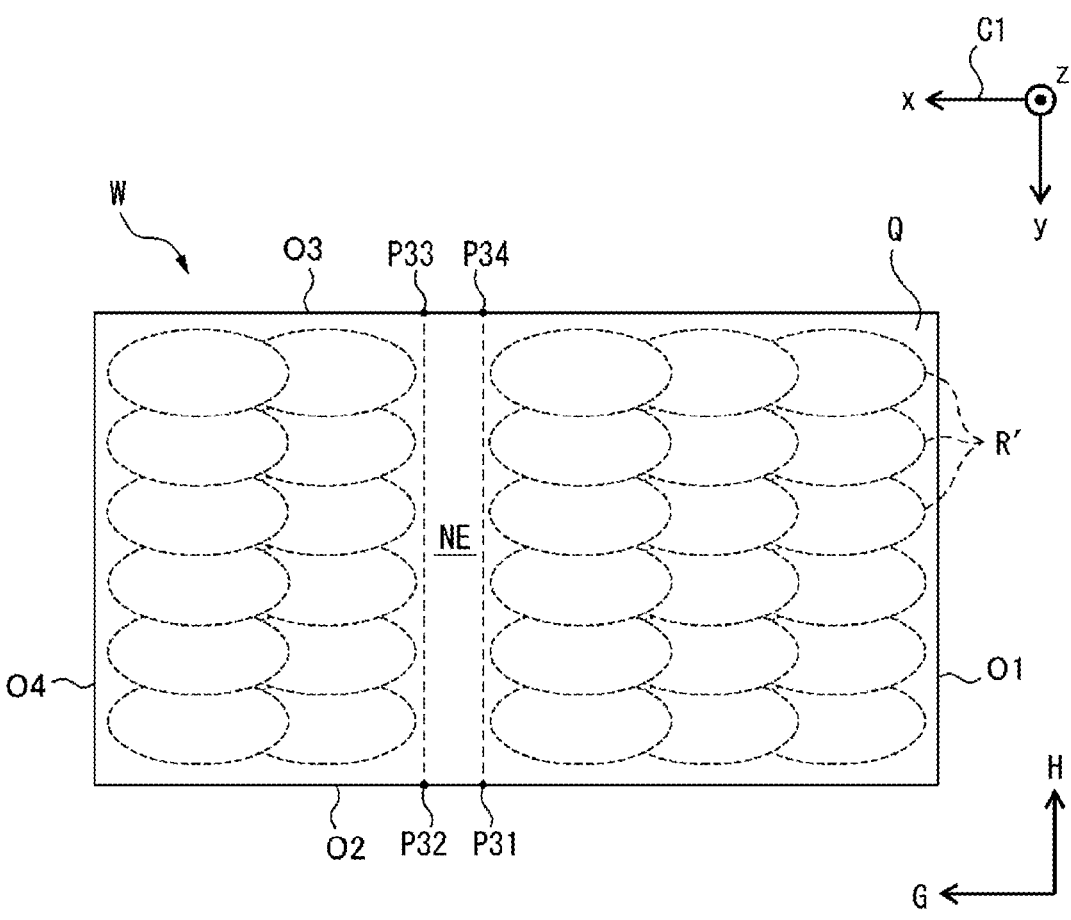
FIG. 34 illustrates a state where a non-machining region is set on the surface of a workpiece.

On the other hand, in the example illustrated in FIG. 34, the non-machining region NE is set in the central region of the surface Q. This non-machining region NE is the region of the surface Q where the recess R should be avoided from being formed by the scraping process. Non-machining region setting information NI includes information of the position (coordinate) in the robot coordinate system C1 that sets the non-machining region NE.

The operator inputs the machining region setting information MI or the non-machining region setting information NI as the pattern information PI. For example, as the machining region setting information MI or the non-machining region setting information NI, the operator inputs the coordinate in robot coordinate system C1 of each apex P31, P32, P33 and P34 of a polygon that defines the machining region ME or the non-machining region NE and information $SI_D$, that specifies the shape of the polygon, as illustrated in FIGS. 33 and 34.

The information $SI_D$' specifying the shape, like the information $SI_D$ described above, includes an order of (e.g., "clockwise direction" or "counterclockwise direction"), for example, the apexes 31, P32, P33 and P34 to be recognized. Alternatively, when the machining region ME or non-machining region NE is circular, the operator may input the coordinate of the center point and the diameter of the circle as the machining region setting information MI or the non-machining region setting information NI.

The processor 40 refers to the machining region setting information MI to set the machining region ME in the robot coordinate system C1, and functions as the position determination section 56 to determine the positions of the recesses R (the positions of the reference points RP) in the machining region ME that is set. As a result, the positions of the recesses R are determined in the machining region ME, as illustrated in FIG. 33.

Alternatively, the processor 40 refers to the non-machining region setting information NI to set the non-machining region NE in the robot coordinate system C1, and functions as the position determination section 56 to determine the positions of the recesses R (e.g., position P1) avoiding the non-machining region NE that is set. As a result, the positions of the recesses R are determined in a region other than non-machining region NE on the surface Q, as illustrated in FIG. 34. For example, by non-machining region setting information NI, the operator can set holes, grooves or protrusions, or the like formed on the surface Q as the non-machining region NE, and arbitrarily avoid executing the scraping process on them on the surface Q.

The offset information PI4 described above may further include information for setting an offset distance $\delta$ between the boundary line of the machining region ME or non-machining region NE and the recess R. In this case, the processor 40 determines the position of the recess R as a position apart from the boundary line of the machining region ME or the non-machining region NE by the offset distance $\delta$.

In addition, the processor 40 may determine the position of the recess R such that the distance between the corresponding virtual occupied region R' and the end edge O is the offset distance $\delta2$ or $\delta4$ or more when receiving the input of the length $x2$ and width $y1$ of the recess R as the dimensional information DI of the machining condition MC and the input of the offset distances $\delta2$ and $\delta4$ (FIG. 17) as the offset information PI4. As described above, the virtual occupied region R' can be estimated from the length x2 and width y1.

The processor 40 may automatically determine other parameters in the machining condition MC according to some parameters of the machining condition MC for which the input has been received from the operator. For example, it is assumed that the operator inputs, as the machining condition MC, the dimensional information DI as x1=10 mm and z1=5 mm, and the command CM as the speed command $PC_{V\_2}$ (speed $V_{P\_2}$)=100 mm/sec. In this case, the processor 40 can automatically determine the speed command $FC_{V\_0}$ (speed $V_{F\_0}$) as the machining condition MC from the input data of the machining condition MC and the above equations (1) and (2), as $FC_{V\_0}$=50 mm/sec The machining condition MC described above may further include the target value $F_T$ of the pressing force F. Additionally, as for the machining condition MC, a data table DT1, in which at least two of the dimensional information DI (length x2, width y1, and depth z3), the trajectory control information TI (distance x1, z1, x3 and z2), the command CM (position control command $PC_n$ and force control command FC) and the target value $F_T$ of force control are stored in association with each other, may be stored in the memory 42. As an example, it is assumed that the operator inputs the depth z3 as the dimensional information DI of the machining condition MC. In this case, the processor 40 may automatically set the target value $F_T$ corresponding to the input depth Z3 by retrieving from the data table DT1.

In the above embodiment, as illustrated in FIG. 7, the case where the tip 32a of the scraper 16 reaches the teaching point TP₃ at the end of the scraping process, and the x coordinate of the position P2 and the teaching point TP₂ in the robot coordinate system C1 are substantially the same, is described. However, in practice, at the end of the scraping process, the tip 32a of the scraper 16 may be displaced from the teaching point TP₃ (e.g., downward) and the position P2 may be displaced from the teaching point TP₂ (e.g., rightward). Such an example is illustrated in FIG. 35.

Figure 35:
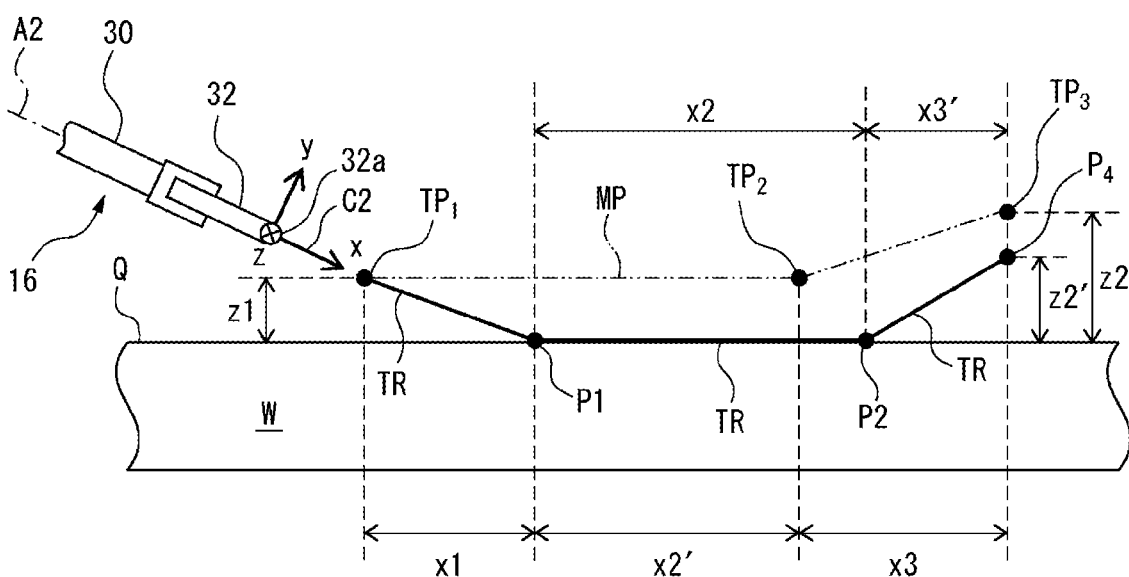
FIG. 35 illustrates another example of a trajectory in which a scraper actually moves during the scraping process.
Figure 35:
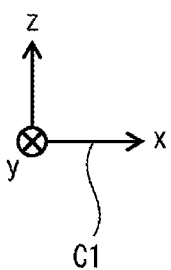

In the example illustrated in FIG. 35, in the actual trajectory TR of the scraper 16 during the scraping process, the position P2 is displaced rightward from the teaching point TP₂, and also when the scraper 16 reaches the position corresponding to the teaching point TP₃, the tip 32a of the scraper 16 is positioned at the trajectory end point P4 displaced downward from the teaching point TP₃.

In this trajectory TR, the distance x2' in the x-axis direction of the robot coordinate system C1 between the position P1 and the teaching point TP₂ becomes smaller than the length x2 of the recess R formed. This distance x2' is a parameter that has a high degree of correlation with the length x2 and can be included in the dimensional information DI. In addition, the distance x3' in the x-axis direction of the robot coordinate system C1 between the position P2 and the trajectory end point P4 (or teaching point TP₃) becomes smaller than the distance x3 between the teaching point TP₂ and the teaching point TP₃.

Furthermore, the distance z2' in the z-axis direction of the robot coordinate system C1 between the position P2 and the trajectory end point P4 becomes smaller than the distance z2 between the position P2 and the teaching point TP₃. The distances x3 and z2 as the trajectory control information TI are parameters that have a high degree of correlation with the distances x3' and z2' of the actual trajectory TR, and the distances x3' and z2' can be included in the trajectory control information TI together with the distances x3 and z2.

The trajectory TR illustrated in FIG. 35 can be formed, for example, in the flow illustrated in FIG. 23 or 25, when the processor 40 omits step S8 and terminates the position control and force control in step S10. In such a case, the operator inputs, by operating the input device 46, the distance x2' as the dimensional information DI together with the length x2, width y1 and depth z3 of the recess R and inputs the distance x3 and z2 as the trajectory control information TI.

When the processor 40 determines the coordinate (X1, Y1, Z1) of the position P1 of the recess R in the above steps S2, S21, S23 or S25, the processor 40 acquires the coordinate of the teaching point TP₂ as a coordinate (X1+x2', Y1, Z1+z1) and the coordinate of the teaching point TP₃ as a coordinate (X1+x2'+x3, Y1, Z1+z2) in the above step S3 according to the teaching point calculation program PG2. Thus, the processor 40 can automatically calculate the teaching point $TP_n$ defining the movement path MP based on the dimensional information DI and the trajectory control information TI.

In the example illustrated in FIG. 35, a data table DT2 in which the length x2 of the recess R and the distances x2', x3 and z2 (or teaching point position data indicating the position of teaching point $TP_n$ with respect to the reference point RP of the recess R) are stored in association with each other, may be stored in the memory 42.

In this case, the operator may input the length x2 of the recess R as the dimensional information DI, and the processor 40 may retrieve, from the data table DT2, the distances x2', x3 and z2 (or teaching point position data) corresponding to the input length x2, and automatically calculate the position of the teaching point $TP_n$ in the robot coordinate system C1 from the distance x2', x3 and z2 (or teaching point position data) and the position of the recess R (position P1) determined by functioning as the position determination section 56. This data table DT2 can be created, for example, by attempting the scraping process at a predetermined machining condition MC and the teaching point $TP_n$ by experimental methods or simulation.

Alternatively, a data table DT2', in which the length x2, distances x3' and z2' and distances x2', x3 and z2 (or teaching point position data) are stored in association with each other, may be stored in the memory 42. In this case, the operator may input the length x2 of the recess R as the dimensional information DI and the distances x3' and z2' as the trajectory control information TI.

The processor 40 may then retrieve, from the data table DT2', distances x2', x3 and z2 (or teaching point position data) corresponding to the lengths x2, x3' and z2', and automatically calculate the position of the teaching point $TP_n$ in the robot coordinate system C1 from the distances x2', x3 and z2 (or teaching point position data) and the position of the recess R (position P1) determined by functioning as position determination section 56.

Note that the row direction G and column direction H are not limited to the illustrated examples, and may be set in any direction with respect to the surface Q. In the flow illustrated in FIGS. 23 and 24, the teaching point $TP_n$ is updated every time the scraping process is executed. However, not limited to this, the processor 40 may, before executing the scraping process, determine the positions of all recesses R and calculate the positions of respective teaching points $TP_n$ for all recesses R whose positions have been determined. Then, the processor 40 may start the scraping process after storing, in the memory 42, respective positions of all recesses R and respective teaching points $TP_n$ calculated for all recesses R.

Furthermore the design that can be specified in the design information PI1 is not limited to the translational design and staggered design described above, but may have any other design, such as, for example, an X-shaped design in which another recess R is superimposed on one recess R in an X-shape, or a random design in which the recesses R are randomly arranged on the surface Q by using a random number table or the like.

In the above embodiment, the case where the reference point RP indicating the position of the recess R is set to the position P1, is described. However, not limited to this, for example, the position P2 or midpoint P3 may be used as the reference point, or any point whose position with respect to the recess R is known may be used.

In the above embodiment, the case where the processor 40 determines the position of the recess R as the coordinate of the robot coordinate system C1, is described. However, not limited to this, the processor 40 may determine, for example, as a coordinate of any other coordinate systems, such as a workpiece coordinate system set for the workpiece W, a world coordinate system specifying the three-dimensional space of the work cell, or a user coordinate system set arbitrarily by the operator. Although the present disclosure has been described through the embodiments, the above-described embodiments do not limit the invention claimed in the claims.

REFERENCE SIGNS LIST

10: Robot system
12: Robot
16: Scraper
18: Control device
40: Processor
52: Robot controller
54: Input receiving section
56: Position determination section
58: Path generation section
60: Device

The invention claimed is:

1. A device configured to determine positions of a plurality of recesses to be formed on a surface of a workpiece by a scraping process in which a robot scrapes the surface with a scraper in order to flatten the surface, the device comprising:
  an input receiving section configured to receive input of shape information of the surface and pattern information determining a positional relationship between the respective recesses to be arranged on the surface, through an input device to which the shape information and pattern information are input by an operator, the input device including at least one of a keyboard, a mouse, and a touch panel;
  and a position determination section configured to automatically determine the position of each of the plurality of recesses on the surface, based on the shape information and the pattern information received by the input receiving section,
  wherein the robot is controlled to execute the scraping process based on the positions of the plurality of recesses determined by the position determination section.

2. The device of claim 1, wherein the pattern information further includes a position cancel condition for defining whether to cancel the position which has been determined by the position determination section when a part of a virtual occupied region of the recess, the position of which has been determined by the position determination section, protrudes outward from an end edge of the surface.

3. The device of claim 1, wherein the pattern information further includes offset information for setting an offset distance of the recess with respect to an end edge of the surface, and wherein the position determination section determines the position such that the recess is displaced from the end edge by the offset distance.

4. The device of claim 1, wherein the pattern information further includes:
  machining region setting information for setting, on the surface, a machining region where the scraping process is to be executed; or
  non-machining region setting information for setting, on the surface, a non-machining region where the scraping process is not to be executed,
wherein the position determination section is configured to:
  determine the position within the machining region; or
  determine the position so as to avoid the non-machining region.

5. The device of claim 1, wherein the input receiving section further receives input of a machining condition for causing the robot to execute the scraping process, and wherein the device further comprises a path generation section configured to, based on the machining condition received by the input receiving section and the position of one recess determined by the position determination section, automatically generate a movement path of the robot when forming the one recess.

6. The device of claim 5, wherein the machining condition includes:
  dimensional information of the recess; and
  trajectory control information for specifying an angle, by which the robot moves and contacts the scraper with the surface in the scraping process, and
  wherein the path generation section automatically calculates teaching points which define the movement path, based on the dimensional information and the trajectory control information.

7. A robot system, comprising:
  a robot configured to move a scraper;
  the device of claim 1; and
  a robot controller configured to control an operation of the robot to execute the scraping process, based on the position determined by the position determination section.

8. A device configured to determine positions of a plurality of recesses to be formed on a surface of a workpiece by a scraping process in which a robot scrapes the surface with a scraper in order to flatten the surface, the device comprising:
  an input receiving section configured to receive input of shape information of the surface and pattern information of the plurality of recesses on the surface, the pattern information including:
  design information for specifying a type of design for arranging the plurality of recesses to align in a lattice pattern in a row direction and a column direction which are defined on the surface;
  and
  a position determination section configured to automatically determine the position of each of the plurality of recesses on the surface, based on the shape information and the pattern information received by the input receiving section, wherein the robot is controlled to execute the scraping process based on the positions of the plurality of recesses determined by the position determination section.

9. The device of claim 8, wherein the pattern information further includes angle information for setting an angle of the row direction or the column direction with respect to a reference direction defined for the surface.

10. The device of claim 8, wherein the pattern information includes pitch information for setting a pitch between two of the plurality of recesses adjacent to each other in the row direction of the column direction.

11. A method of determining positions of a plurality of recesses to be formed on a surface of a workpiece by a scraping process in which a robot scrapes the surface with a scraper in order to flatten the surface, the method comprising:

receiving, by a processor, input of shape information of the surface and pattern information determining a positional relationship between the respective recesses to be arranged on the surface, through an input device to which the shape information and pattern information are input by an operator, the input device including at least one of a keyboard, a mouse and a touch panel;

and automatically determining, by the processor, the position of each of the plurality of recesses on the surface, based on the received shape information and the pattern information, wherein the robot is controlled to execute the scraping process based on the determined positions of the plurality of recesses.

12. A method of determining positions of a plurality of recesses to be formed on a surface of a workpiece by a scraping process in which a robot scrapes the surface with a scraper in order to flatten the surface, the method comprising:

receiving, by a processor, input of shape information of the surface and pattern information of the plurality of recesses on the surface, the pattern information including design information for specifying a type of design for arranging the plurality of recesses to align in a lattice pattern in a row direction and a column direction which are defined on the surface; and automatically determining, by the processor, the position of each of the plurality of recesses on the surface, based on the received shape information and the pattern information, wherein the robot is controlled to execute the scraping process based on the determined positions of the plurality of recesses.

\* \* \* \* \*